US011103398B2

(12) United States Patent
Zerhusen et al.

(10) Patent No.: US 11,103,398 B2
(45) Date of Patent: Aug. 31, 2021

(54) FLEXIBLE OVERHEAD ARM

(71) Applicant: Hill-Rom Services, Inc., Batesville, IN (US)

(72) Inventors: Robert M. Zerhusen, Batesville, IN (US); Jonathan K. Moenter, Batesville, IN (US); Joshua L. Meyer, Batesville, IN (US); Robert D. Ross, Durham, NC (US); John G. Byers, Brookville, IN (US); Matthew R. Knue, Sunman, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 600 days.

(21) Appl. No.: 15/976,984

(22) Filed: May 11, 2018

(65) Prior Publication Data

US 2018/0333317 A1     Nov. 22, 2018

Related U.S. Application Data

(60) Provisional application No. 62/572,922, filed on Oct. 16, 2017, provisional application No. 62/507,727, filed on May 17, 2017.

(51) Int. Cl.
| | | |
|---|---|---|
| *A61G 7/05* | (2006.01) | |
| *A61G 12/00* | (2006.01) | |
| *H01R 13/713* | (2006.01) | |
| *H02J 7/00* | (2006.01) | |

(52) U.S. Cl.
CPC ............. *A61G 7/05* (2013.01); *A61G 7/0503* (2013.01); *A61G 12/00* (2013.01); *A61G 12/002* (2013.01); *A61G 12/008* (2013.01); *H01R 13/7135* (2013.01); *A61G 2203/20* (2013.01); *A61G 2203/78* (2013.01); *H02J 7/0042* (2013.01)

(58) Field of Classification Search
CPC ...... A61G 7/05; A61G 12/00; H01R 13/7135; H02J 7/0042
See application file for complete search history.

(56) References Cited

U.S. PATENT DOCUMENTS

| | | | |
|---|---|---|---|
| 2,607,881 A * | 8/1952 | Anderson | ............... F21V 21/14 362/144 |
| 3,358,957 A | 12/1967 | Lindenmuth | |
| 3,757,363 A | 9/1973 | Langlais | |
| 3,889,914 A | 6/1975 | Torme | |
| 3,977,645 A | 8/1976 | Deely | |
| 4,023,757 A | 5/1977 | Allard et al. | |
| 4,183,015 A * | 1/1980 | Drew | .................. A61G 7/0507 340/286.07 |
| 4,410,158 A | 10/1983 | Maffei | |
| 4,465,255 A | 8/1984 | Hill | |
| 4,591,124 A | 5/1986 | Hellenbrand et al. | |
| 4,846,434 A | 7/1989 | Krogsrud | |

(Continued)

OTHER PUBLICATIONS

Extended European Search Report, European Application No. 18172177.0-1113, completed Mar. 9, 2018, (6 pages).

*Primary Examiner* — Eric J Kurilla
(74) *Attorney, Agent, or Firm* — Barnes & Thornburg LLP

(57) ABSTRACT

An overhead arm assembly for a patient support apparatus includes a user interface device. The user interface device has a support structure for supporting a personal digital assistant and a charging port for personal digital assistant.

20 Claims, 16 Drawing Sheets

(56) References Cited

U.S. PATENT DOCUMENTS

| | | | | |
|---|---|---|---|---|
| 5,072,906 A | * | 12/1991 | Foster | A61G 7/05 248/122.1 |
| 5,100,091 A | | 3/1992 | Pollak | |
| 5,211,367 A | | 5/1993 | Musculus | |
| 5,230,289 A | | 7/1993 | George et al. | |
| 5,542,138 A | * | 8/1996 | Williams | A47C 31/008 5/503.1 |
| 5,592,153 A | * | 1/1997 | Welling | A61G 7/05 248/278.1 |
| 5,787,528 A | | 8/1998 | Antinori | |
| 6,131,868 A | * | 10/2000 | Welling | A61G 7/05 248/276.1 |
| 6,351,678 B1 | | 2/2002 | Borders | |
| 6,486,792 B1 | * | 11/2002 | Moster | A47C 31/008 340/4.11 |
| 6,560,492 B2 | | 5/2003 | Borders | |
| 6,560,798 B2 | | 5/2003 | Welling et al. | |
| 6,658,680 B2 | | 12/2003 | Osborne et al. | |
| 6,704,956 B2 | | 3/2004 | Riley et al. | |
| 6,728,985 B2 | | 5/2004 | Brooke et al. | |
| 6,761,344 B2 | | 7/2004 | Welling et al. | |
| 6,781,517 B2 | | 8/2004 | Moster et al. | |
| 6,973,688 B2 | | 12/2005 | Barker et al. | |
| 7,008,269 B2 | | 3/2006 | Riley et al. | |
| 7,010,369 B2 | | 3/2006 | Borders et al. | |
| 7,017,243 B2 | * | 3/2006 | Carnevali | A45F 5/00 24/3.1 |
| 7,019,464 B2 | | 3/2006 | Nevins | |
| 7,200,882 B2 | | 4/2007 | Heimbrock | |
| 7,789,187 B2 | | 9/2010 | Zerhusen et al. | |
| 8,258,973 B2 | | 9/2012 | Newkirk | |
| 8,334,779 B2 | | 12/2012 | Zerhusen et al. | |
| 8,499,384 B2 | | 8/2013 | Zerhusen | |
| 8,561,959 B2 | | 10/2013 | Matsuoka | |
| 8,565,934 B2 | | 10/2013 | Rawls-Meehan | |
| 8,572,778 B2 | | 11/2013 | Newkirk et al. | |
| 8,583,144 B2 | * | 11/2013 | Kavounas | H04M 19/045 455/456.4 |
| 8,833,716 B2 | * | 9/2014 | Funk | F16M 13/022 248/316.4 |
| 8,869,328 B2 | | 10/2014 | Rawls-Meehan | |
| 8,910,333 B2 | | 12/2014 | Wu | |
| 9,259,371 B2 | | 2/2016 | Zerhusen | |
| 9,492,341 B2 | | 11/2016 | Huster et al. | |
| 9,717,344 B2 | | 8/2017 | Rawls-Meehan | |
| 9,737,155 B2 | | 8/2017 | Rawls-Meehan | |
| 10,028,875 B2 | | 7/2018 | Hatch | |
| 2002/0085344 A1 | | 7/2002 | Fields et al. | |
| 2003/0056293 A1 | | 3/2003 | Brooke et al. | |
| 2003/0076238 A1 | | 4/2003 | Moster et al. | |
| 2003/0195644 A1 | | 10/2003 | Borders et al. | |
| 2003/0230702 A1 | * | 12/2003 | Welling | A61G 7/05 248/694 |
| 2004/0157496 A1 | | 8/2004 | Riley et al. | |
| 2004/0212314 A1 | | 10/2004 | Nevins | |
| 2005/0007258 A1 | | 1/2005 | Moster et al. | |
| 2006/0056616 A1 | * | 3/2006 | Heimbrock | H04M 1/04 379/428.01 |
| 2006/0058587 A1 | | 3/2006 | Heimbrock et al. | |
| 2006/0117482 A1 | | 6/2006 | Branson | |
| 2006/0162083 A1 | * | 7/2006 | Heimbrock | A61G 7/0533 5/662 |
| 2006/0260054 A1 | | 11/2006 | Lubbers et al. | |
| 2007/0180616 A1 | | 8/2007 | Newkirk et al. | |
| 2009/0121660 A1 | | 5/2009 | Rawls-Meehan | |
| 2010/0132122 A1 | | 6/2010 | Hollingshead | |
| 2010/0229304 A1 | | 9/2010 | Heimbrock et al. | |
| 2011/0214234 A1 | * | 9/2011 | Herman | A61G 7/0524 5/600 |
| 2011/0247139 A1 | * | 10/2011 | Tallent | H04L 67/12 5/613 |
| 2012/0102434 A1 | | 4/2012 | Zerhusen et al. | |
| 2012/0117730 A1 | * | 5/2012 | Lemire | A61G 5/10 5/611 |
| 2013/0131870 A1 | | 5/2013 | Zerhusen et al. | |
| 2013/0198959 A1 | | 8/2013 | Wu | |
| 2013/0206942 A1 | * | 8/2013 | Trotsky | F16M 11/10 248/274.1 |
| 2014/0042285 A1 | * | 2/2014 | Carnevali | F16M 13/00 248/316.4 |
| 2014/0209777 A1 | | 7/2014 | Klemin et al. | |
| 2015/0196443 A1 | | 7/2015 | Tarquinio | |
| 2016/0008197 A1 | * | 1/2016 | Zerhusen | A61G 7/0513 5/503.1 |
| 2016/0120329 A1 | | 5/2016 | Zerhusen | |
| 2018/0161225 A1 | * | 6/2018 | Zerhusen | A61G 7/0536 |
| 2019/0015276 A1 | * | 1/2019 | Bhimavarapu | H02J 7/0042 |
| 2020/0275877 A1 | * | 9/2020 | Fitzgibbons | A61B 5/706 |

\* cited by examiner

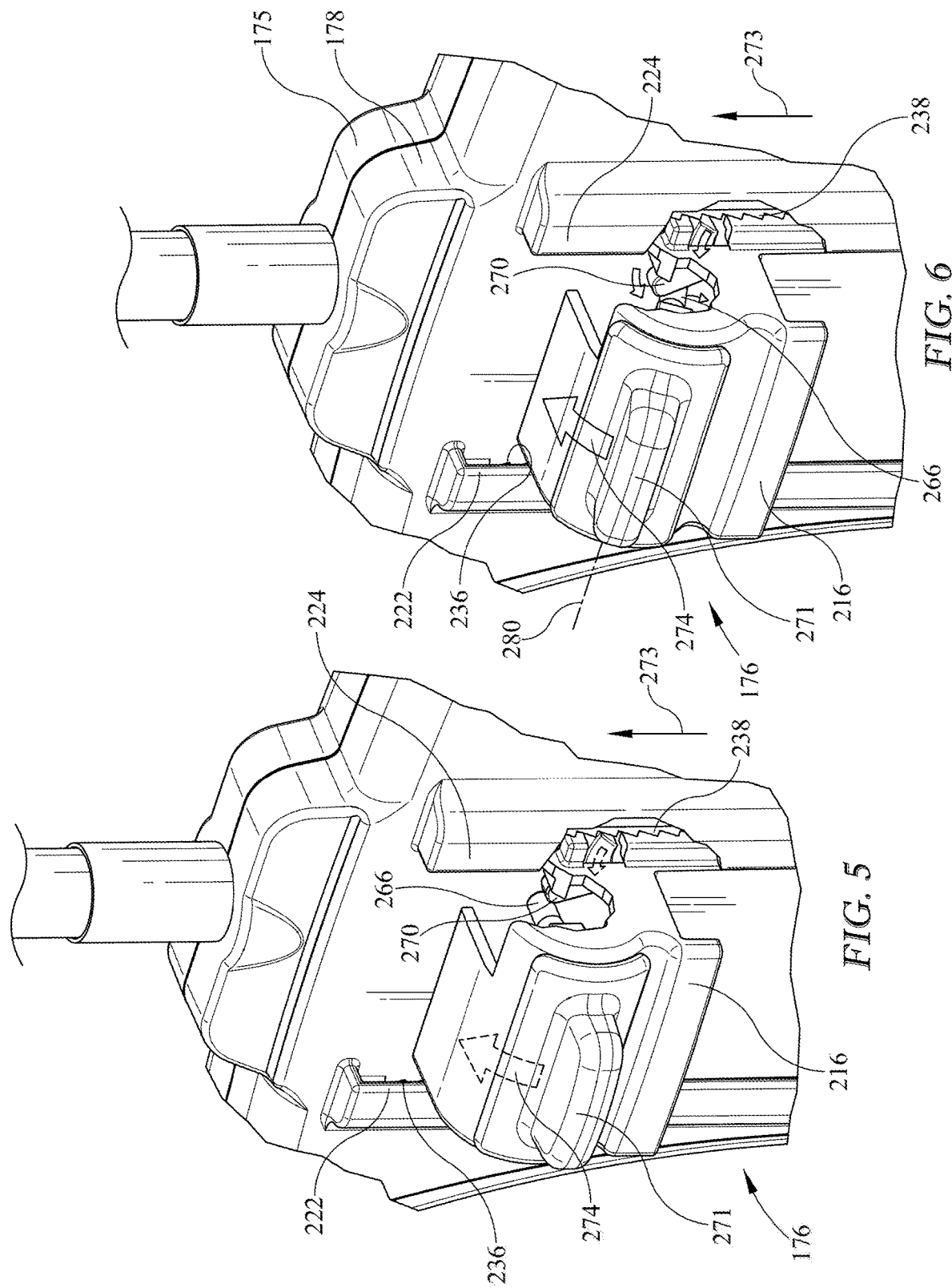

FLEXIBLE OVERHEAD ARM

PRIORITY CLAIM

This application claims priority under 35 U.S.C. § 119(e) to U.S. Provisional Application Nos. 62/572,922, filed Oct. 16, 2017, and Ser. No. 62/507,727, filed May 17, 2017, which are expressly incorporated by reference herein.

BACKGROUND

The present disclosure relates to features of patient support apparatuses such as hospital beds. In one aspect, the present disclosure relates to patient control arms having user inputs that a patient uses to control features and functions of hospital beds, as well as supporting and charging personal digital assistants, such as tablet computers, for example.

Handheld personal phones, aka smartphones, and other personal digital assistants (PDAs) such as tablet computers are owned by a large percentage of the population. Patients in healthcare facilities prefer to have their phones and PDAs accessible while admitted to a healthcare facility. However, current patient support apparatuses on the market today do not adequately address patients' desire for ease of use of their smartphones while confined to a patient support apparatus. Some patient's and caregivers may wish to interact with one another via the patient's phone or PDA. Other aspects of a patient's care while in a healthcare facility may be enhanced if a patient has access to their PDA. Allowing patients better ergonomic use of their personal PDAs while confined to a hospital bed, for example, may improve their experience while in a hospital or other healthcare facility.

SUMMARY

The present disclosure includes one or more of the features recited in the appended claims and/or the following features which, alone or in any combination, may comprise patentable subject matter. According to a first aspect of the present disclosure, a user interface for a patient support apparatus comprises a frame including a first side and a second side, and a support structure positioned on the second side. The support structure is configured to support personal digital assistants of varying sizes. The support structure includes a fixed base and a movable clamp, the movable clamp movable relative to the fixed base with a locking mechanism resisting movement of the movable clamp away from the base.

In some embodiments, the movable clamp includes an actuator that releases the movable clamp for movement away from the base.

In some embodiments, the movable clamp comprises a first bias member that biases the locking mechanism to a locked position and second bias member that biases the locking mechanism to a released position.

In some embodiments, first bias member has a bias that is greater than the second bias member.

In some embodiments, the first bias member may be overcome by a user to disengage the bias of the first bias member from the locking mechanism.

In some embodiments, the first bias member may be overcome by a user to disengage the bias of the first bias member from the locking mechanism.

In some embodiments, the movable clamp comprises a first bias member that biases the locking mechanism to a locked position and second bias member that biases the locking mechanism to a released position.

In some embodiments, the first bias member has a bias that is greater than the second bias member.

In some embodiments, the first bias member may be overcome by a user to disengage the bias of the first bias member from the locking mechanism.

In some embodiments, the first bias member may be overcome by a user to disengage the bias of the first bias member from the locking mechanism.

In some embodiments, the first bias member is a torsional spring.

In some embodiments, the second bias member is integral formed in the locking mechanism.

In some embodiments, the locking mechanism includes a lock that has a pair of arms, the arms formed to include catches, and the locking mechanism further includes guides that are each engaged by the respective arms.

In some embodiments, the guides include serrations engaged by the catches on the arms.

In some embodiments, the torsional spring is coupled to an actuator that is movable into and out of engagement with the arms.

In some embodiments, when the actuator is out of engagement with the arms, the second bias member disengages the catches from the serrations.

In some embodiments, the actuator includes a pair of posts, each post engaging with a respective arm of the lock.

In some embodiments, the locking mechanism includes a lock that has a pair of arms, the arms formed to include catches, and the locking mechanism further includes guides that are each engaged by the respective arms.

In some embodiments, the guides include serrations engaged by the catches on the arms.

In some embodiments, the movable clamp comprises a first bias member that biases the arms to a locked position and second bias member that biases the arms to a released position.

In some embodiments, the user interface comprises a dedicated charging port positioned on the first side.

In some embodiments, the dedicated charging port is provided with two modes of patient protection from electrical faults.

In some embodiments, the dedicated charging port is monitored for faults.

In some embodiments, the dedicated charging port is controlled by a dedicated charging port controller.

In some embodiments, the dedicated charging port is a USB charging port.

In some embodiments, the fault monitor includes two modes of patient protection from electrical faults.

In some embodiments, the user interface device further comprises at least one user input device positioned on the first side.

In some embodiments, the at least one user input device is a nurse call activation switch.

According to a second aspect of the present disclosure, an overhead arm assembly for a patient support apparatus includes a user interface device of the first aspect of the disclosure.

In some embodiments, the overhead arm assembly includes a coupler configured to couple the overhead arm assembly to a frame of the patient support apparatus.

In some embodiments, the coupler includes a detent to control the position of the coupler relative to the patient support apparatus.

In some embodiments, the overhead arm assembly includes first portion pivotable relative to the patient support apparatus, a second portion pivotable relative to the first portion, and a third portion pivotable relative to the second portion.

In some embodiments, the user interface is pivotable relative to the third portion.

In some embodiments, the pivoting of the second portion relative to the first portion is mechanically limited.

In some embodiments, the pivoting of the third portion relative to the second portion is mechanically limited.

In some embodiments, the pivoting of the user interface relative to the third portion is mechanically limited.

In some embodiments, the first portion includes to a pivot base and the second portion includes a pivot member that pivots relative to the pivot base.

In some embodiments, the overhead arm assembly includes a first motion control assembly for controlling motion of the second portion relative to the first portion.

In some embodiments, the first motion control assembly includes a brake ring that is fixed to the second portion and frictionally engages the first portion.

In some embodiments, the overhead arm assembly further comprises a second motion control assembly for controlling motion of the third portion relative to the second portion.

In some embodiments, the second motion control assembly includes a brake ring that is fixed to the second portion and frictionally engages the third portion.

According to another aspect of the present disclosure, an overhead arm assembly for a patient bed may be provided. The overhead arm assembly may include a first L-shaped arm that may have a first bottom end that may be configured to couple to the patient bed, a second L-shaped arm, a third arm that may pivotably interconnect the first and second L-shaped arms, and a patient interface unit that may be suspended from a bottom region of the second L-shaped arm. The overhead arm assembly may have a use position in which the first and second L-shaped arms may be pivoted with respect to the third arm such that the patient interface unit is suspended for use by a patient on the patient bed. The overhead arm assembly may have a transport position in which the first and second L-shaped arms may be collapsed together such that the patient interface unit may be situated adjacent a substantially vertical portion of the first L-shaped arm. The overhead arm assembly may have a T-shaped configuration in the transport position.

In some embodiments, the overhead arm assembly may further include a clip that may be coupled to the substantially vertical portion of the first L-shaped arm. A substantially vertical portion of the second L-shaped arm may be received by the clip when the overhead arm assembly is in the transport position.

If desired, the third arm may be situated above the first and second L-shaped arms. A first pivot joint assembly may be provided at a first end of the third arm to pivotably interconnect the third arm and the first L-shaped arm. A second pivot joint assembly may be provided at a second end of the third arm to pivotably interconnect the third arm and second L-shaped arm. Optionally, a first flexible pad may be attached to the first pivot joint assembly and a second flexible pad may be attached to the second pivot joint assembly. The first and second pads may serve as anti-skid feet when the overhead arm assembly is detached from the patient bed and turned upside down and resting on a floor for storage.

In some embodiments, a strain relief may be attached to the substantially vertical portion of the first L-shaped arm. An electrical cable may be routed from the patient interface unit through the first and second L-shaped arms and the third arm and may exit the substantially vertical portion of the L-shaped arm behind the strain relief. A first connector may be provided at a distal end of the cable. The first connector may be configured to mate with a second connector that may be included on the patient bed. The first connector may be a 90 degree male D-sub connector, for example. The second connector may be a female connector that may be situated on a downwardly facing surface of the bed such that the first connector may be moved upwardly to mate with the second connector.

According to a further aspect of the present disclosure, an overhead arm assembly for use with a patient bed may include a plurality of interconnected pivotable arms. A free end of a first arm of the plurality of arms may be configured to couple to the patient bed. A patient interface unit may be suspended from a second arm of the plurality of arms. The patient interface unit may have a first flex circuit overlay attached thereto. The first flex circuit overlay may be selected from a plurality of different flex circuit overlays. The first flex circuit overlay may have buttons for controlling a first set of features of the patient bed.

In some embodiments, the first flex circuit overlay may include a dead front nurse call button that may be illuminated and visible in response to the patient bed being in communication with a nurse call system and that may not be illuminated and substantially not visible in response to the patient bed not being in communication with the nurse call system. Optionally, each flex circuit overlay of the plurality of flex circuit overlays may include a dead front nurse call button that may be illuminated and visible in response to the patient bed being in communication with a nurse call system and that may be not illuminated and substantially not visible in response to the patient bed not being in communication with the nurse call system.

Alternatively or additionally, the first flex circuit overlay may include a stay in bed indicator that may be illuminated in response to a bed exit or patient position monitoring system of the patient bed being enabled and that may not be illuminated in response to the bed exit or patient position monitoring system of the patient bed not being enabled. Optionally, each flex circuit overlay of the plurality of flex circuit overlays may include a stay in bed indicator that may be illuminated in response to a bed exit or patient position monitoring system of the patient bed being enabled and that may not be illuminated in response to the bed exit or patient position monitoring system of the patient bed not being enabled.

If desired, the first flex circuit overlay may include a stand assist button that may be pressed by a patient to move deck sections of the patient bed to a position conducive for exiting a side of the bed. In some embodiments, each flex circuit overlay of the plurality of flex circuit overlays may include a stand assist button that may be pressed by a patient to move deck sections of the patient bed to a position conducive for exiting a side of the bed.

It is contemplated by this disclosure that some flex circuit overlays of the plurality of flex circuit overlays may include mattress control buttons for inflating and deflating at least one mattress bladder to increase and decrease, respectively, mattress firmness and others of the flex circuit overlays may not include mattress control buttons. Alternatively or additionally, some flex circuit overlays of the plurality of flex circuit overlays may include lighting control buttons for turning on and off a room light or a reading light and others of the flex circuit overlays may not include lighting control buttons. Further alternatively or additionally, some flex circuit overlays of the plurality of flex circuit overlays may include television control buttons for controlling a television in a patient room and others of the flex circuit overlays may not include television control buttons. If desired, each flex circuit overlay of the plurality of flex circuit overlays may include deck section control buttons that may be pressed by a patient to move deck sections of the patient bed. Further optionally, each flex circuit overlay of the plurality of flex circuit overlays may have back lighting turned on for each button corresponding to a controllable function and may have back lighting turned off for each button corresponding to a function that is not controllable.

According to still another aspect of the present disclosure, an overhead arm assembly for use with a patient bed may include a plurality of interconnected pivotable arms. A free end of a first arm of the plurality of arms may be configured to couple to the patient bed. A patient interface unit may be suspended from a second arm of the plurality of arms. The patient interface unit may have a reading light with a touch sensor. The touch sensor may be touched by a patient to change an intensity or brightness level at which the reading light emits light.

In some embodiments, the reading light with touch sensor may be located at a bottom of a patient interface unit. The intensity or brightness levels may include low, medium, high, and off levels, for example.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which:

FIG. 5 is a view of a portion of the user interface portion of FIG. 3 with portions removed to show the functioning of a movable clamp of the support structure, the movable clamp in a locked position;

FIG. 6 is a view similar to FIG. 5 with the movable clamp in an unlocked position;

DETAILED DESCRIPTION

Figure 1:
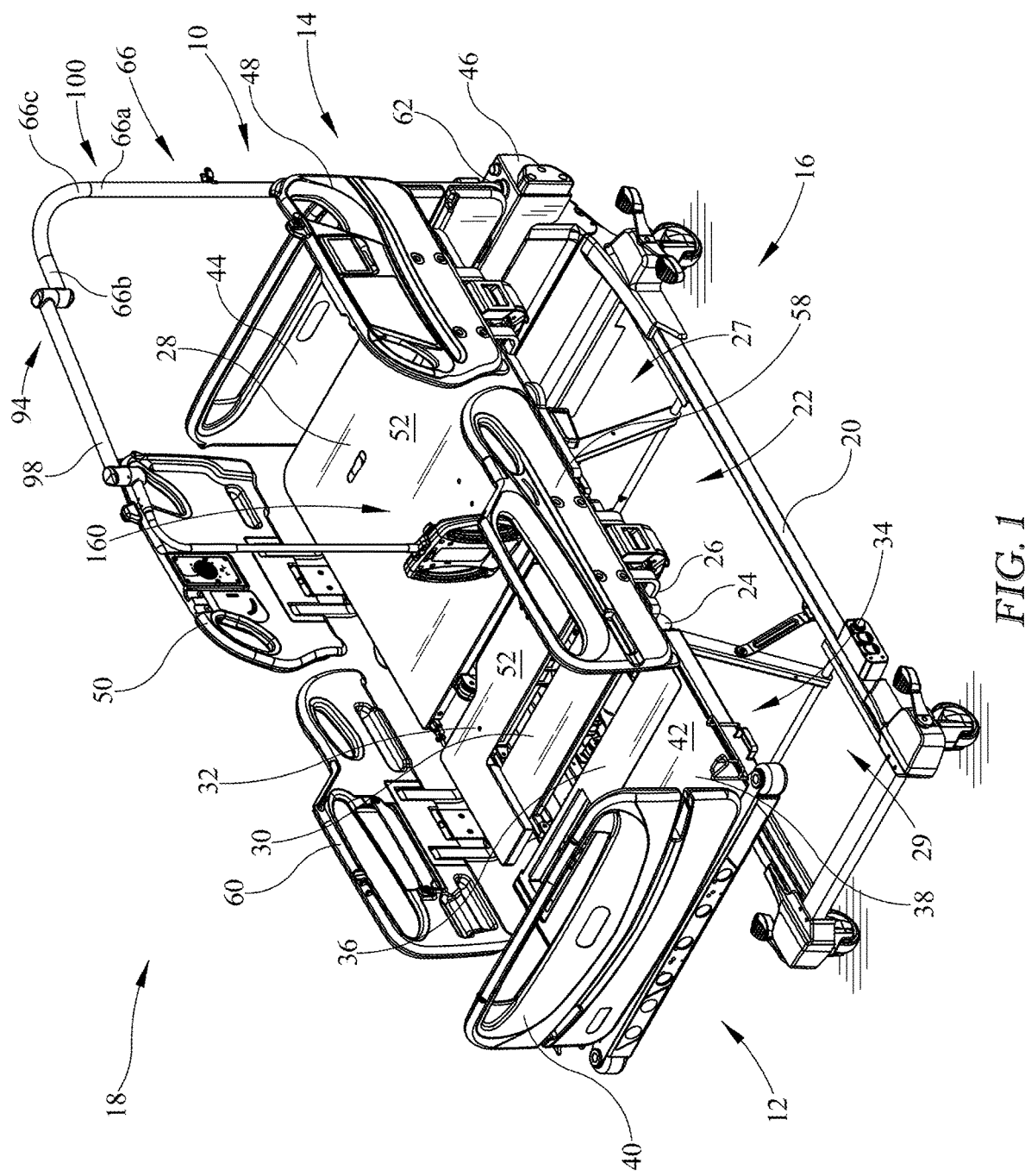
FIG. 1 is a perspective view of a patient support apparatus embodied as a hospital bed, the hospital bed including an overhead arm assembly that is used to provide a user interface to a patient supported on the bed.

Referring to FIG. 1, a patient support apparatus 10 is illustratively embodied as a hospital bed 10. The hospital bed 10 includes an overhead arm assembly 100 that is used to provide support for a patient interface device 160, best seen in FIG. 3. The patient interface device 160 is illustratively embodied as a tablet computer in the embodiment of FIG. 3. In other embodiments, the overhead arm assembly 100 may support other patient interface devices such as smartphones, laptops, patient pendants for controlling operation of portions of the hospital bed 10, or other electronic equipment.

The view shown in FIG. 1 is generally taken from a position that is oriented at the left side, foot end of the hospital bed 10. For purposes of orientation, the discussion of the hospital bed 10 will be based on the orientation of a patient supported on the hospital bed 10 in a supine position. Thus, the foot end 12 of the hospital bed 10 refers to the end nearest the patient's feet when the patient is supported on the hospital bed 10 in the supine position. The hospital bed 10 has a head end 14 opposite the foot end 12. A left side 16 refers to the patient's left when the patient is lying in the hospital bed 10 in a supine position. The right side 18 refers to the patient's right. When reference is made to the longitudinal length of the hospital bed 10, it refers a direction that is represented by the lines that generally extend between the head end 14 and foot end 12 of the hospital bed 10. Similarly, lateral width of the hospital bed 10 refers to a direction that is represented by the lines that generally extend between the left side 16 and right side 18.

The hospital bed 10 includes a base frame 20 which supports a lift system 22. The lift system 22 engages the base and an upper frame 24 such that the lift system 22 moves the upper frame 24 vertically relative to the base frame 20. The lift system 22 includes a head end linkage 27 and a foot end linkage 29. Each of the linkages 27 and 29 are independently operable and may be operated to cause the hospital bed 10 to move into a tilt position which is when the head end 14 of the upper frame 24 is positioned lower than the foot end 12 of the upper frame 24. The hospital bed 10 may also be moved to a reverse tilt position with the foot end 12 of the upper frame 24 is positioned lower than the head end 14 of the upper frame 24.

The upper frame 24 supports a load frame 26. The load frame 26 supports a head deck 28 (sometimes referred to as a head section) which is movable relative to the load frame 26. The load frame 26 also supports an articulated seat deck 30 (sometimes referred to as a thigh section), also movable relative to the load frame 26 and a fixed seat deck 32 (sometimes referred to as a seat section). Also supported from the load frame 26 is a foot deck 34 (sometimes referred to as a foot section) that is articulated and moveable relative to the load frame 26. The foot deck 34 in the illustrative embodiment of FIG. 1 provides for powered pivoting of the foot deck 34 and manual extension and retraction of the foot deck 34 to vary the length of the foot deck 34. In other embodiments, powered pivoting of the foot deck 34 may be omitted and the related movement may be caused manually, or follow movement of the articulated seat deck 30. In addition, in some embodiments, extension and retraction of the foot deck 34 may be powered by an actuator.

The foot deck 34 includes a first portion 36 and a second portion 38, which moves relative to the first portion 36 to vary the size of the foot deck 34. The second portion 38 moves generally longitudinally relative to the first portion 36 to vary the longitudinal length of the foot deck 34 and, thereby, the longitudinal length of the hospital bed 10.

A foot panel 40 (sometimes referred to as a footboard) is supported from the second portion 38 and extends vertically from an upper surface 42 of the second portion 38 to form a barrier at the foot end 12 of the hospital bed 10. A head panel 44 (sometimes referred to as a headboard) is positioned on an upright structure 46 of the base frame 20 and extends vertically to form a barrier at the head end 14 of the hospital bed 10. A left head siderail 48 is supported from the head deck 28 and is moveable between a raised position shown in FIG. 1 and a lowered position as is known in the art. A right head siderail 50 is also moveable between the raised position of FIG. 1 and lowered position.

The hospital bed 10 also includes a left foot siderail 58 and a right foot siderail 60, each of which is supported directly from the load frame 26. Each of the siderails 48, 50, 58, and 60 are operable to be lowered to a position below the upper surface 52 of the respective head section 28 or seat section 32 as the case may be. It should be noted that when the head deck 28 is moved, the head siderails 48 and 50 move with the head deck 28 so that they maintain their relative position to the patient. This is because both of the head siderails 48 and 50 are supported by the head deck 28.

Figure 2:
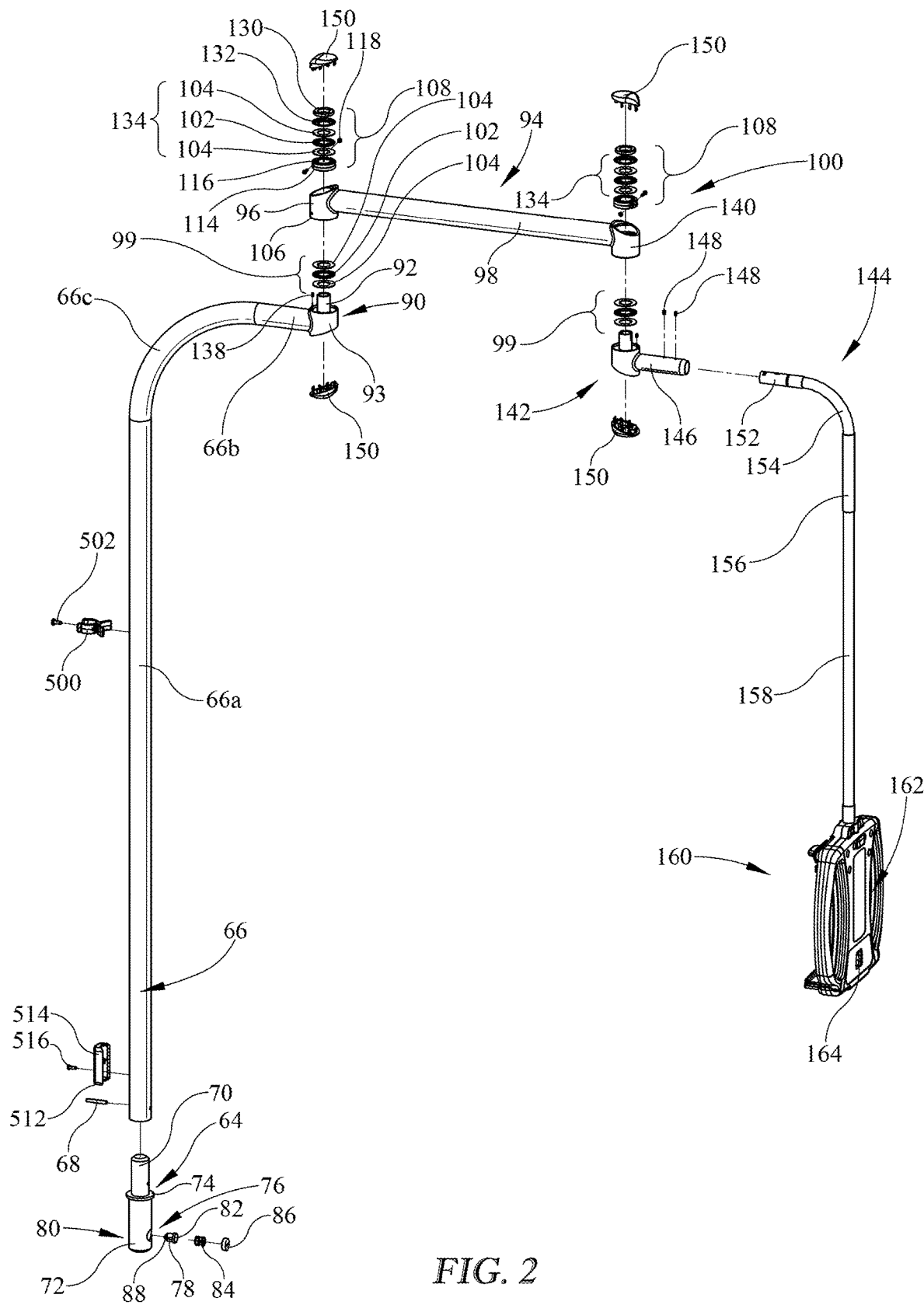
FIG. 2 is an exploded assembly view of the arm assembly of the overhead arm assembly of FIG. 1.

The overhead arm assembly 100 is supported from the upright structure 46 and received in a socket 62 formed therein. A coupler 64, shown in FIG. 2 is positioned in the socket 62 and supports a tubular upright post or arm 66 of the overhead arm assembly 100. The post 66 is secured to the coupler 64 by a roll pin 68 with a protrusion 70 of the coupler 64 being received into the bottom of the tubular upright post 66 and secured by the pin 68 as suggested in FIG. 2. The coupler 64 includes a base 72 that is separated from the protrusion 70 by an annular flange 74. The base 72 is received in the socket 62 with the flange 74 limiting the travel of the coupler 64 into the socket 62.

The coupler 64 is formed to include a throughhole 76 into which a plunger 78 is positioned. The plunger 78 extends beyond the surface of the base 72 at the location identified by arrow 80. The through-hole 76 is formed to include a counter-sink (not shown) with a flat surface which is engaged by an annular flange 82 of the plunger 78. The flange 82 is urged against the surface of the countersink by a spring 84. The spring 84 engages (e.g., touches, contacts, or presses against) a plug 86 that is threaded into the through-hole 76 to bias the spring 84 against the plunger 78 to urge a plunger tip 88 of plunger 78 to extend beyond the surface of the base 72 at the opposite side of through-hole 76 (i.e., the side of through-hole pointed to generally by arrow 80 but that cannot be seen in FIG. 2). The bias of spring 84 against the plunger 78 allows the plunger 78 to secure the overhead arm assembly 100 in the socket 62. In the illustrative embodiments, the tip 88 of the plunger 78 acts as a bias member to limit rotation in the socket 62. In other embodiments, the plunger 78 may cooperate with a cross-hole (not shown) formed in the socket 62 so that the plunger 78 acts as a detent and secures the coupler 64 to the socket 62 and prevents rotation of the coupler 64 relative to the socket 62.

Arm 66 is generally L-shaped and includes a substantially vertical portion 66a, a substantially horizontal portion 66b, and a curved transition portion 66c that interconnects a top of portion 66a with portion 66b. An end portion 66b of the post 66 is secured to a pivot base 90 by a weld. The pivot base 90 is formed to include a tubular axle 92 that extends upwardly from a frame 93. The axle 92 of the pivot base 90 supports a generally horizontal pivot arm 94 that includes a pivot member 96 which is secured to one end of a tubular arm portion 98 of arm 94 by a weld. The pivot member 96 rests on a bearing assembly 99 through which the axle 92 extends. The bearing assembly 99 includes a thrust bearing 102 positioned between two thrust washers 104, 104 so that a lower edge 106 of pivot member 96 engages the upper thrust washer 104 and the lower thrust washer 104 engages the pivot base 90. The axle 92 extends through a flange 112 (see FIG. 10) formed in the pivot member 96.

A motion control assembly 108 is positioned on the axle 92 above the flange 112 formed in the pivot member 96. The motion control assembly 108 is tuned to provide pliable resistance to the rotation of the pivot arm 94 about the axle 92 so that the pivot arm 94 will be retained in position when it is moved relative to the pivot base 90 and post 66. When enough force is applied to overcome the resistance of the motion control assembly 108, the pivot arm 94 can be repositioned, but will retain the new position when the force is removed. The retention in the new position is caused by the motion control assembly 108.

The motion control assembly 108 includes a brake ring 114 that is positioned over the axle 92 and is clamped to the axle 92 by a screw 116 and nut 118 to provide a gripping action on the axle 92 as shown in FIG. 2. Thus, the brake ring 114 has a radially extending split 115, shown in FIG. 10, that closes as screw 116 and nut 118 are tightened. Still referring to FIG. 10, the brake ring 114 includes a pair of tabs 120, 122 that extend from a lower surface 124 of the brake ring 114. The flange 112 includes a pair of anti-rotation slots 124, 126 that are engaged by the brake ring 114 tabs 120, 122, respectively. In this way, the brake ring 114 is fixed relative to the pivot member 96. The tension developed in the screw 116 controls the clamping force of the brake ring 114 to provide control of the force necessary to cause the pivot arm 94 to pivot relative to the pivot base 90.

Referring again to FIG. 2, the pivot member 96 is secured to the pivot base 90 by a nut 130 that is threaded onto the axle 92. A spring washer 132 is positioned below the nut 130 and engages a bearing assembly 134 that is positioned on the brake ring 114. The bearing assembly 134 includes a thrust bearing 102 positioned between two thrust washers 104, 104. The spring washer 132 is configured to allow the nut 130 to be positioned to pre-load the spring washer 132 to secure the bearing assembly 134 onto the brake ring 114 without binding motion of the pivot arm 94 relative to the pivot base 90.

Figure 10:
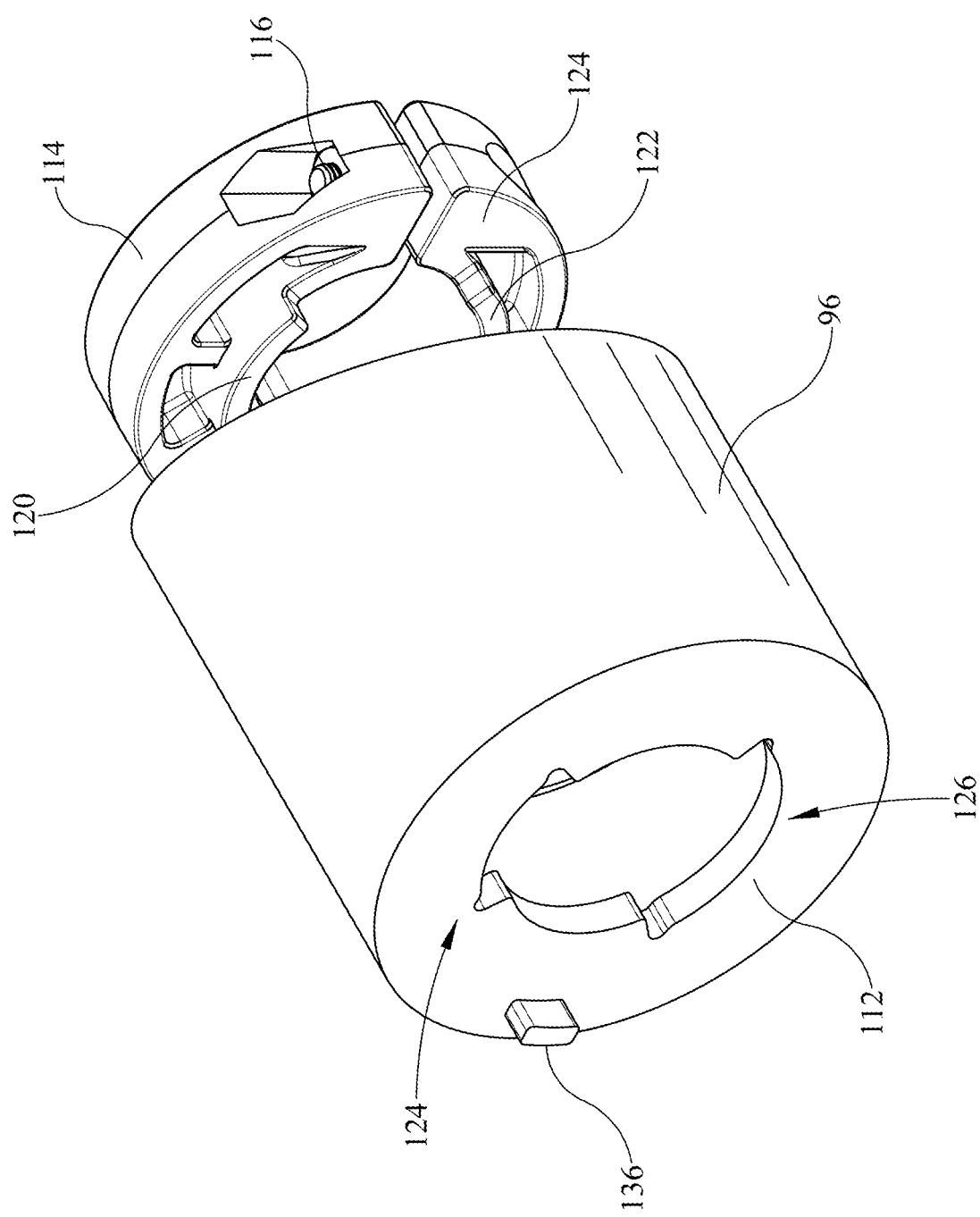
FIG. 10 is a perspective view of a portion of the arm assembly of FIG. 2 showing the interface between a brake ring and a pivot support.

The pivot member 96 is formed to include a motion limiter or tab 136, as shown in FIG. 10. The motion limiter 136 engages a pin 138 positioned in the pivot base 90 when the pivot member 96 is rotated, thereby limiting the rotation of the pivot member 96 to the pivot base 90 to approximately 360 degrees, but not complete rotation about the axle 92. Thus, arm 94 is able to rotate slightly less (e.g., two to five degrees less) than 360 degrees relative to arm 66. This prevents damage to electrical cables routed through the overhead arm assembly 100 as will be discussed in more detail below.

The pivot arm 94 includes a second pivot member 140 positioned at an end of tube 98 opposite the pivot member 96. Pivot member 140 is welded to tube 98. The pivot member 140 engages another pivot base 142 in a manner similar to that discussed above with regard to the interaction of pivot member 96 and pivot base 90, so the discussion of the relevant structure will not be duplicated and the same reference numbers are used for like structure.

The pivot base 142 supports a flexible arm assembly 144 (sometimes referred to herein as just arm 144) that is secured to a tubular arm 146 of the pivot base 142 by a pair of screws 148, 148 as suggested in FIG. 2. The overhead arm assembly 100 further includes four caps 150, 150, 150, 150 that are secured to the pivot bases 90, 142 and the pivot members 96, 140 as suggested in FIG. 2. The caps 150, 150, 150, 150 seal the pivot bases 90, 142 and the pivot members 96, 140 after a cable is routed through the overhead arm assembly 100 as will be discussed in further detail below.

The flexible arm assembly 144 includes a rigid collar 152 which is secured to a curved tubular flexible arm 154. A rigid leg 156 is secured to the curved tubular flexible arm 154 and a tubular flexible leg 158 is secured to the rigid leg 156. The flexible arm 154 and flexible leg 158 are "gooseneck" structures that are pliable to allow for adjustment of the shape of the flexible arm 154 and flexible leg 158 to allow a user interface unit 160 to be adjusted as will be discussed in further detail below.

Figure 9:
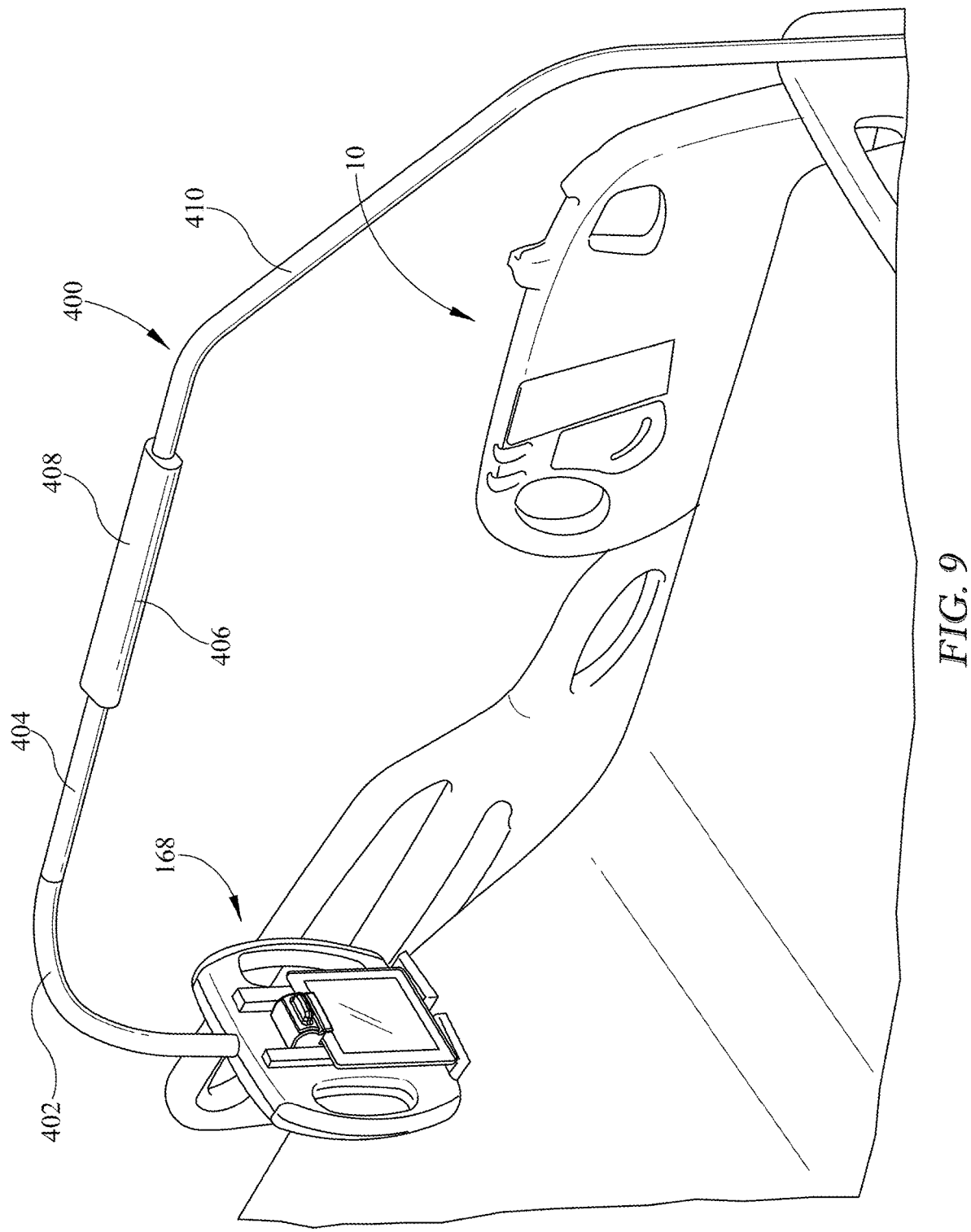
FIG. 9 is a perspective view of a portion of a hospital bed having an overhead arm assembly with a different embodiment of arm structure.

In another embodiment shown in FIG. 9, an overhead arm assembly 400 includes a user interface unit 160 which is supported from a flexible arm 402. The flexible arm 402 is connected to a rigid upper arm 404. The rigid upper arm 404 is supported from a pair of flexible upper arms 406, 408 which are then supported from a bent tube 410. The bent tube 410 is supported from the upright structure 46 in a manner similar to the overhead arm assembly 100 discussed above. The flexible tubes disclosed herein may be of the type sold by Moffatt Products Inc., 222 Cessna Street, Watertown, S. Dak. 57201.

Figure 3:
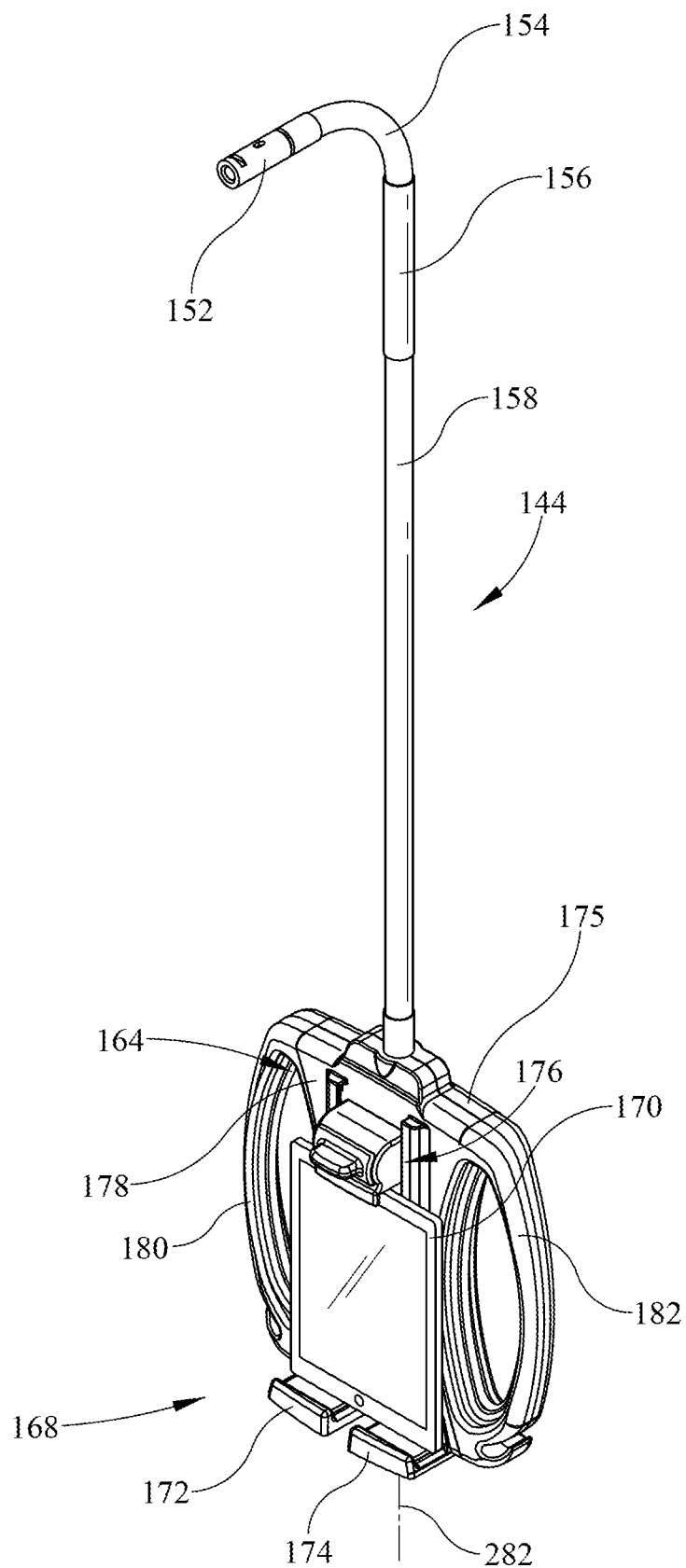
FIG. 3 is a perspective view of the user interface portion of the overhead arm assembly of FIG. 1, the user interface portion including a support structure supporting a personal digital assistant device.
Figure 4:
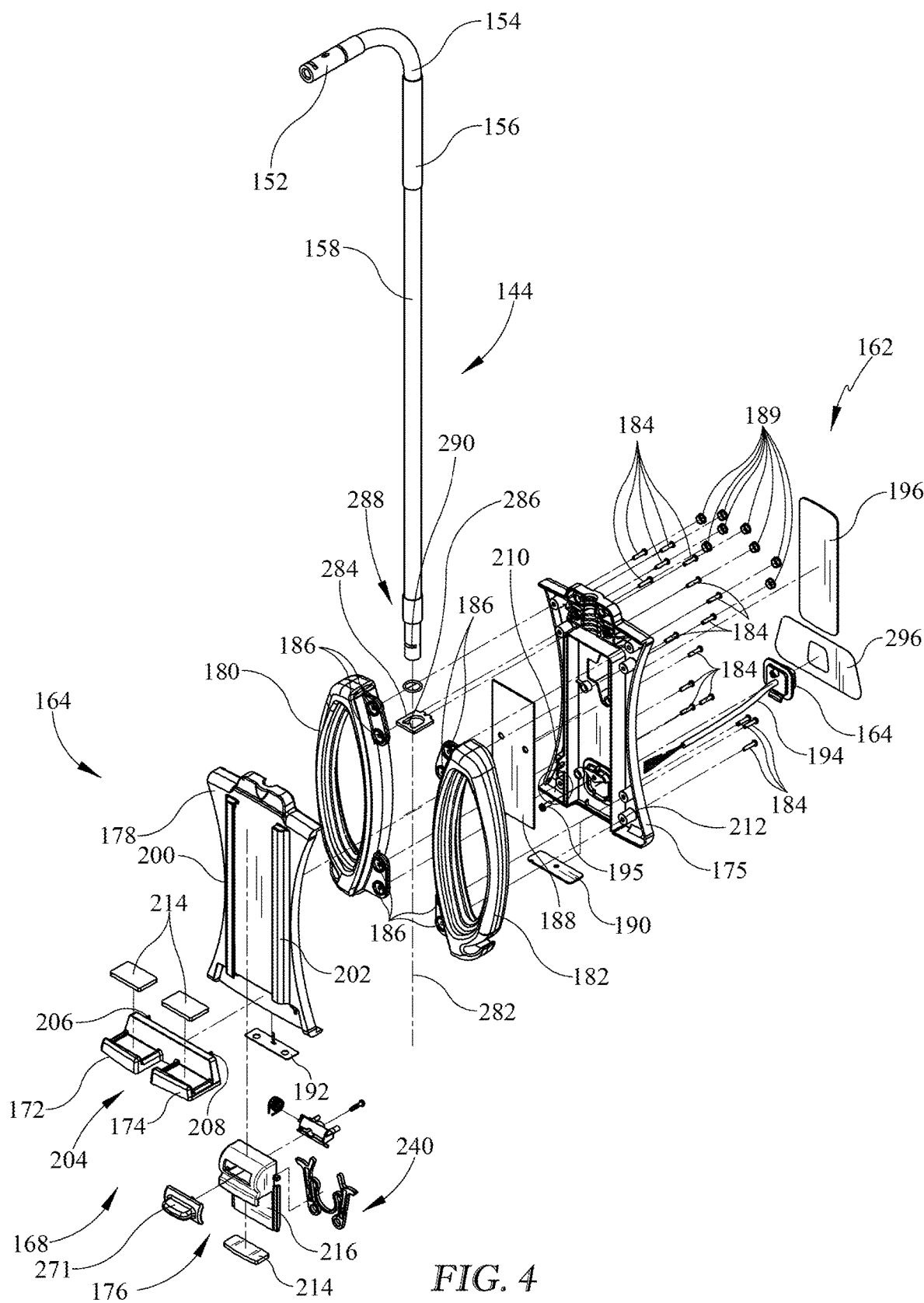
FIG. 4 is an exploded assembly view of a patient interface portion of the overhead arm assembly of FIG. 1.

The user interface unit 160 has a side 162, shown in FIG. 2, which is formed to include a USB charging port 164 and a side 166, shown in FIGS. 3 and 4, that includes a support structure 168 for supporting a personal digital assistant (PDA), illustratively embodied as a tablet computer 170 in FIG. 3. The support structure 168 includes a pair of bases 172, 174, on which a bottom of the tablet computer 170 is positioned, and an adjustable clamp 176 which engages a top of the tablet computer 170 to thereby retain the tablet computer 170 to the user interface unit 160.

The user interface unit 160 includes a first frame member 175 and a second frame member 178. A pair of handles 180, 182 are each captured between the frame members 175, 178 when the frame members 175, 178 are secured together by a number of screws 184 that pass through the second frame member 178 and holes 186 formed in the handles 180, 182, the screws 184 being threaded into the first frame member 175. The screws 184 are received in counterbores (not shown) of frame member 175 and are covered by plugs 189. A printed circuit board assembly (PCBA) 188 is positioned between the frame members 175, 178, with an LED light assembly 190 being positioned in the bottom of the user interface unit 160 and positioned between the frame members 175, 178. A light cover 192 is positioned over the LED light assembly 190 and is secured to the frame members 175, 178 with a pair of screws (not shown).

The USB charging port 164 is coupled to a cable 194 that is, in turn, connected to the PCBA 188 with the USB charging port 164 being secured to the frame member 175 by a screw 195. A USB overlay 296 is positioned on the frame member 178 and provides indicia indicative of the operation of the USB charging port 164. A flex circuit overlay 196 is positioned on the frame member 175 on side 162; the flex circuit overlay 196 being configured to provide various user input devices in the form of membrane switches (not shown). The membrane switches may include various functions that are of interest to a patient on the hospital bed 10. Various examples of flex circuit overlays 196*a-d* are described below in connection with FIGS. 16-19. In the illustrative embodiment, the flex circuit overlay 196 includes switches for activating a nurse call and for controlling the LED light assembly 190. Other functions that may be available in other embodiments include, but is not limited to, television controls, audio controls, lighting controls, environmental controls such as heating and air conditioning, and window blind controls.

The support structure 168 for supporting the PDA 170 in FIG. 3 is designed so that the adjustable clamp 176 is movable along a pair of guides 200, 202 formed in the frame member 178. The pair of bases 172, 174, on which the tablet computer 170 is positioned are formed as part of a monolithic structure 204 which includes a pair of posts 206, 208 which extend through the frame member 178 and are received into guides 210, 212 formed in the frame member 175. The posts 206, 208 are secured by screws 184 as described above. A pair of cushions 214, 214 are each positioned on respective bases 172, 174 and provide a resilient flexible surface on which the PDA 170 rests. The cushions 214, 214 are configured to grip the PDA 170 to reduce movement relative to the support structure 168.

Figure 12:
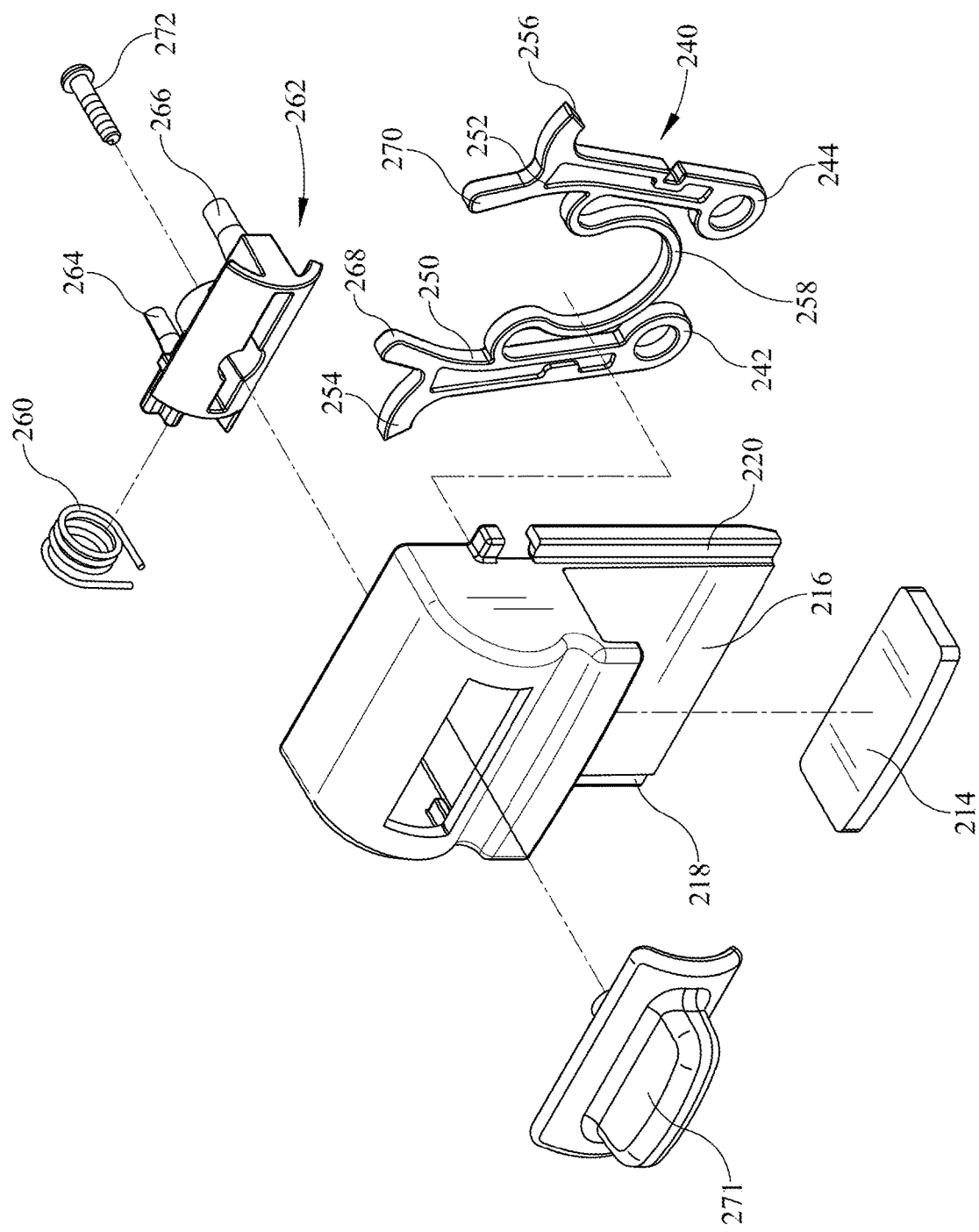
FIG. 12 is an enlarged exploded view of a portion of the movable clamp.

The adjustable clamp 176 includes a grip 216 that is formed to include flanges 218, 220 (best seen in FIG. 12), that are retained by flanges 222, 224 of the guides 200, 202. The grip 216 is positioned with the flanges 222, 224 in the guides 200, 202 before the structure 204 is secured to the frame members 175, 178. The guides 200, 202 each include a serrated surface 236, 238 (see FIGS. 5 and 6) formed in the guides 200, 202. The serrated surfaces 236, 238 provide a ratcheting structure that is used to secure the grip 216 in position when the grip 216 is engaged with the PDA 170. A cushion 214 (see FIG. 4) is positioned on the grip 216 to grip the PDA 170 to reduce movement relative to the support structure 168.

Figure 11:
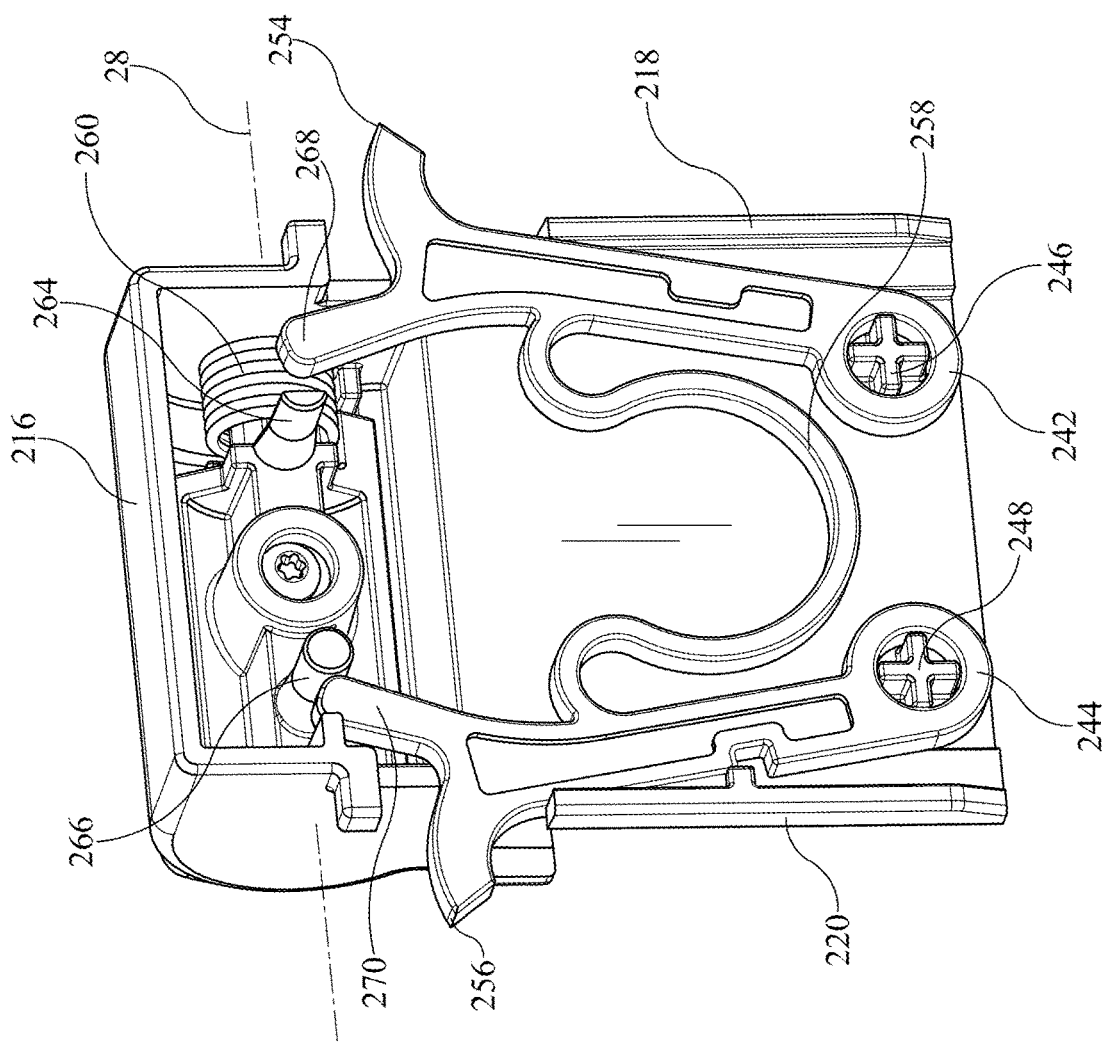
FIG. 11 is a perspective view of a portion of the movable clamp of the support structure showing the mounting of a lock to a grip of the movable clamp.

The adjustable clamp 176 further includes a flexible lock 240 that is positioned on the grip 216 as shown in FIG. 11. The flexible lock 240 is formed monolithically and includes a pair of rings 242, 244 that are positioned on respective posts 246, 248 of the clamp 176. A pair of arms 250, 252 are each pivotable about the posts 246, 248 to cause two catches 254, 256 to move laterally into and out of engagement with the serrated surfaces 236, 238. A bias member 258 urges the catches 254, 256 inwardly and out of engagement with the serrated surfaces 236, 238. In normal operation, the bias of the bias member 258 is overcome by a torsional spring 260 shown in FIGS. 11 and 12. The torsional spring 260 engages an actuator 262 that includes two posts 264, 266 that are biased act on the ends 268, 270 of the arms 250, 252 which tend to urge the catches 254, 256 outwardly to engage the serrated surfaces 236, 238. In operation, the bias of the torsional spring 260 is greater than the bias of the bias member 258 so that the bias of the bias member 258 is overcome and the normal operating position of the catches 254, 256 is in engagement with the serrated surfaces 236, 238. A handle 271 is secured to the actuator 262 by a screw 272, shown in FIG. 12, so that movement of the handle 271 causes movement of the actuator 262, and, thereby, the posts 264, 266.

Referring now to FIGS. 5 and 6, the operation of the adjustable clamp 176 is illustrated. In FIG. 5, the handle 271 is in a neutral position and the torsional spring 260 is dominating the bias member 258 so that the catches 254, 256 are engaged with the serrated surfaces 236, 238. The shape of the serrated surfaces 236, 238 causes the catches 254, 256 to be secured within a serration so that movement of the adjustable clamp 176 upwardly, in the direction of arrow 273 is precluded. In operation, the adjustable clamp 176 is moved up to provide sufficient clearance for the PDA 170 by lifting the handle 271 as suggested by the arrow 274 in FIG. 6, which rotates the actuator 262 about an axis 280 and disengages the posts 264, 266 from the ends 268, 270, so that the catches 254, 256 are disengaged from the serrated surfaces 236, 238. This overcomes the bias of the spring 260 and the bias member 258 urges the catches 254, 256 out of engagement with the serrated surfaces 236, 238 allowing the adjustable clamp 176 to be moved in the direction of arrow 273.

Once the PDA 170 is positioned on the bases 172, 174 and positioned below the adjustable clamp 176, a user releases handle 271 and pushes down on the grip 216 (see FIGS. 11 and 12) to move the grip 216 in a direction opposite arrow 273. The shape of the serrated surfaces 236, 238 permits the catches 254, 256 to slip past the serrations as the grip 216 is moved downwardly. This action overcomes the bias of the spring 260 so that the catches 254, 256 ratchet on the serrated surface 236, 238. Once the grip 216 is fully engaged with the PDA 170, the bias of the spring 260 causes the catches 254, 256 to engage the corresponding serrations of the serrated surfaces 236, 238, thereby locking the PDA 170 between the adjustable clamp 176 and the bases 172, 174, until the adjustable clamp 176 is released with the handle 271.

Figure 7:
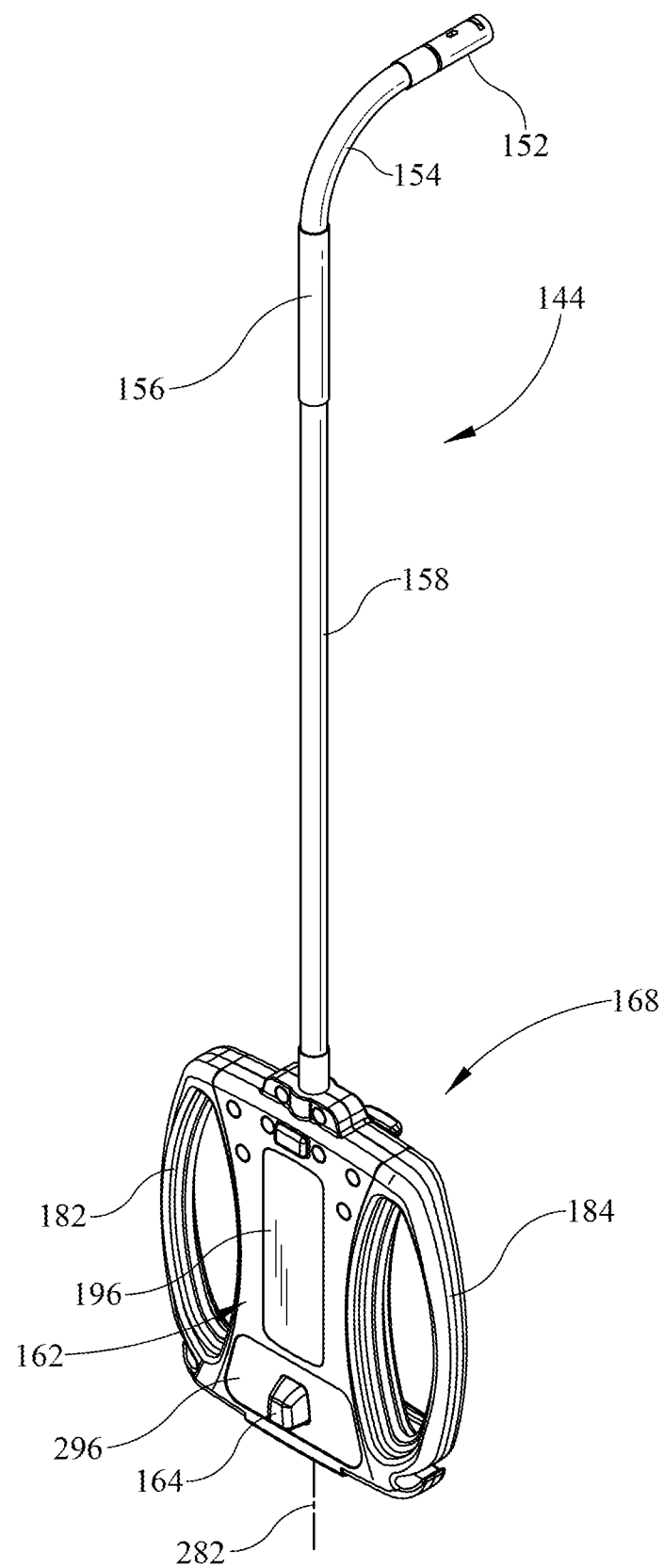
FIG. 7 is a perspective view of the user interface portion of the overhead arm assembly of FIG. 1, the user interface portion being rotated to that the user interface portion includes a user interface and a dedicated USB charging port.

A user can position the user interface unit 160 with the PDA 170 facing toward them or rotate the user interface unit 160 to have access to the other side 162 of unit 160. Rotation of the user interface unit 160 about an axis 282 (see FIGS. 4 and 7) is limited by a rotation limiter 284 that has a tab 286, received in a slot 290 of a coupler 288 of the flexible arm assembly 144 (see FIG. 4). The coupler 288 interconnects the flexible leg 158 and the user interface unit 160. The slot 290 is formed so that the user interface unit 160 can only be rotated by about 180 degrees about the axis 282. This also prevents damage to cabling that is passed through the flexible arm assembly 100.

In a medical application, where a patient may be exposed to an electrical signal, isolation is needed to insure that even with failure; the patient is not exposed to any electrical current. To accomplish this, a minimum of 2 means of patient protection (MOPP) is needed. This is governed by IEC60601 with specific details on allowable boundary materials, their ratings and any allowable leakage currents, modes of isolation or separation. In the illustrative design, 2 MOPP of isolation between the AC mains and the bed electronics is provided. There is also 2MOPP provided between the bed 28 VDC bus and the USB charging port 164. This approach leaves the AC mains wiring local to the main electrical system of the bed 10 while only a lower DC voltage is distributed in the bed 10 and in overhead arm assembly 100.

Figure 8:
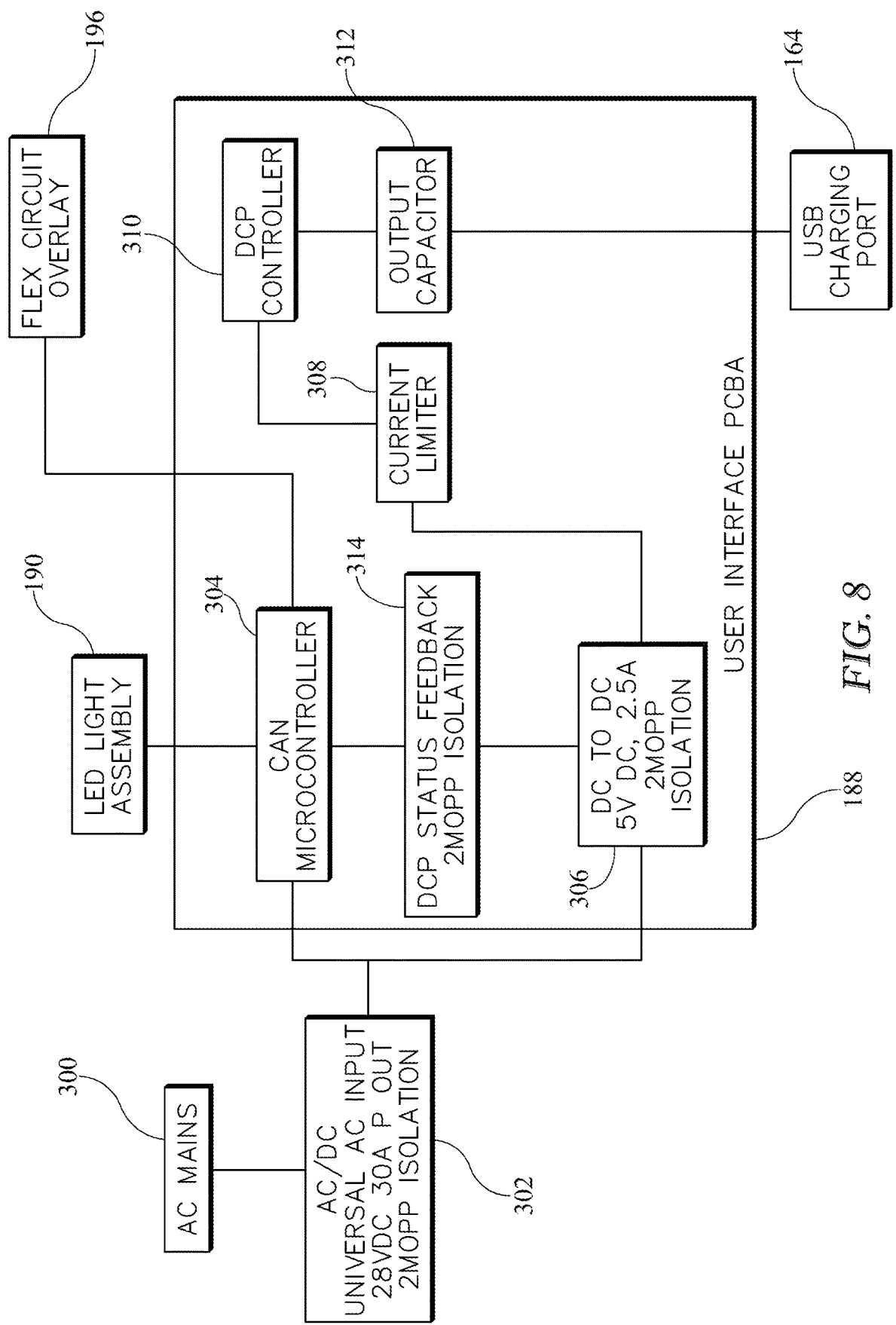
FIG. 8 is a block diagram of a portion of the electrical system of the patient support apparatus and the patient interface of FIG. 1, including structure for electrically isolating and monitoring the operation of the USB charging port.

Referring now to FIG. 8, the AC Mains power 300 is delivered to an AD/DC converter 302 that provides bed level electrical DC power at 28 VDC and 30 A, with two modes of patient protection (2 MOPP) implemented within the IEC60601 standard. The DC power is delivered to the bed electronics, such as a controller area network (CAN) microcontroller 304 on the user interface PCBA 188. In the case of the USB charging port 164, an additional layer of isolation is delivered with a DC to DC converter 306 that transforms the 28 V DC power bus down to a 5 VDC power source with 2.5 A of current available. This supply is separate from the supply used by the other bed electronics. The circuit for supplying the USB charging port 164 includes a current limiting device 308 which feeds a dedicated charging port (DCP) controller 310. The DCP controller 310 has an output that passes through a capacitor 312 and is delivered to the USB charging port 164. In addition, a DCP status feedback device 314 is connected to the DC/DC converter 306 to monitor operations of the USB charging circuit including the controller 310. The device 314 provides this information to the CAN microcontroller 304 which provides the capability for monitoring of usage statistics and faults for logging and feedback to maintenance operators.

Figure 13:
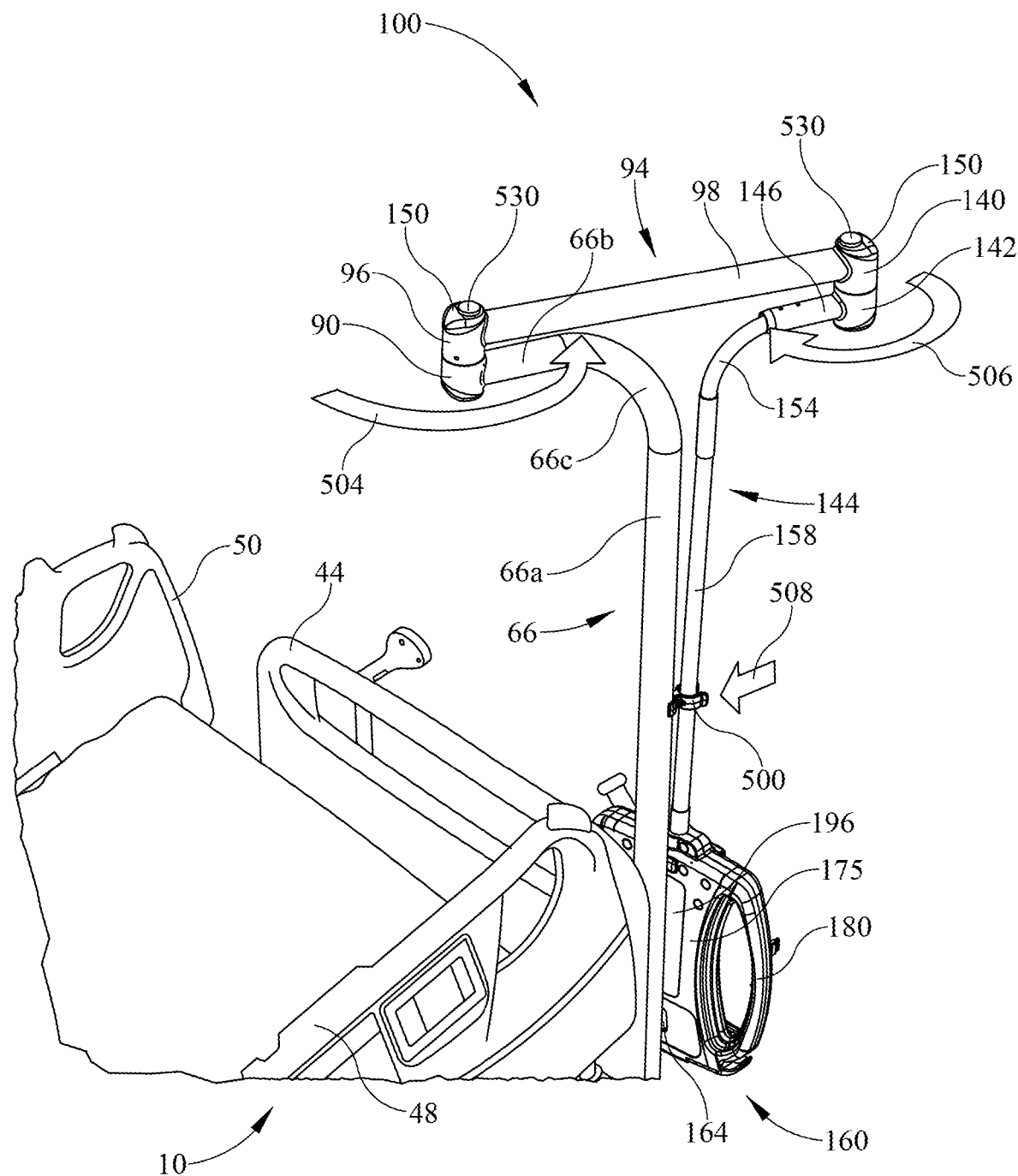
FIG. 13 is a perspective view showing a portion of the hospital bed and showing the overhead arm assembly in a transport position having a substantially vertical portion of one arm of the overhead arm assembly clipped to a substantially vertical portion of another arm of the overhead arm assembly so that the overhead arm assembly has a T-shaped configuration.

Referring now to FIG. 13, the overhead arm assembly 100 is folded or collapsed into a transport position when the bed 10 is being moved from one location in a healthcare facility to another. A clip 500 is fastened to portion 66a of arm 66 with a suitable fastener such as illustrative screw 502 (see FIG. 1). When overhead arm assembly 100 is in the transport position, substantially vertical portion 158 of arm 144 is attached to clip 500 such that arm 158 is situated against or closely adjacent to substantially vertical portion 66a of arm 66 as shown in FIG. 13. Clip 500, therefore, has a C-shape which resiliently snaps around arm 158 to retain arm 158 in place relative to arm 66. This prevents arms 66, 94, 144 from swinging around in an unwanted, uncontrolled manner during transport of bed 10, particularly when bed 10 is turned around corners. In the transport position, overhead arm assembly 100 has a T-shaped configuration.

To move arm assembly to the transport position from the use position shown in FIG. 1, for example, arm 94 together with arm 144 is rotated relative to pivot base 90 of arm 66 by about 180 degrees as indicated by arrow 504 in FIG. 13. Then, arm 144 is rotated relative pivot base 140 of arm 94 by about 180 degrees as indicated by arrow 506. Some or all of the motion of overhead arm assembly 100 indicated by arrows 504, 506 may occur simultaneously if desired. After arm 144 has been moved to a position having portion 158 of arm 144 situated closely adjacent to portion 66a of arm 66, portion 158 of arm 144 is snapped into clip 500 in the direction indicated by arrow 508. As is apparent in FIG. 13, the flexibility of arm 144 permits portion 158 to be slightly bent around portion 66a of arm 66 to bring the lower region of arm 158 into registry with clip 500.

Figure 14:
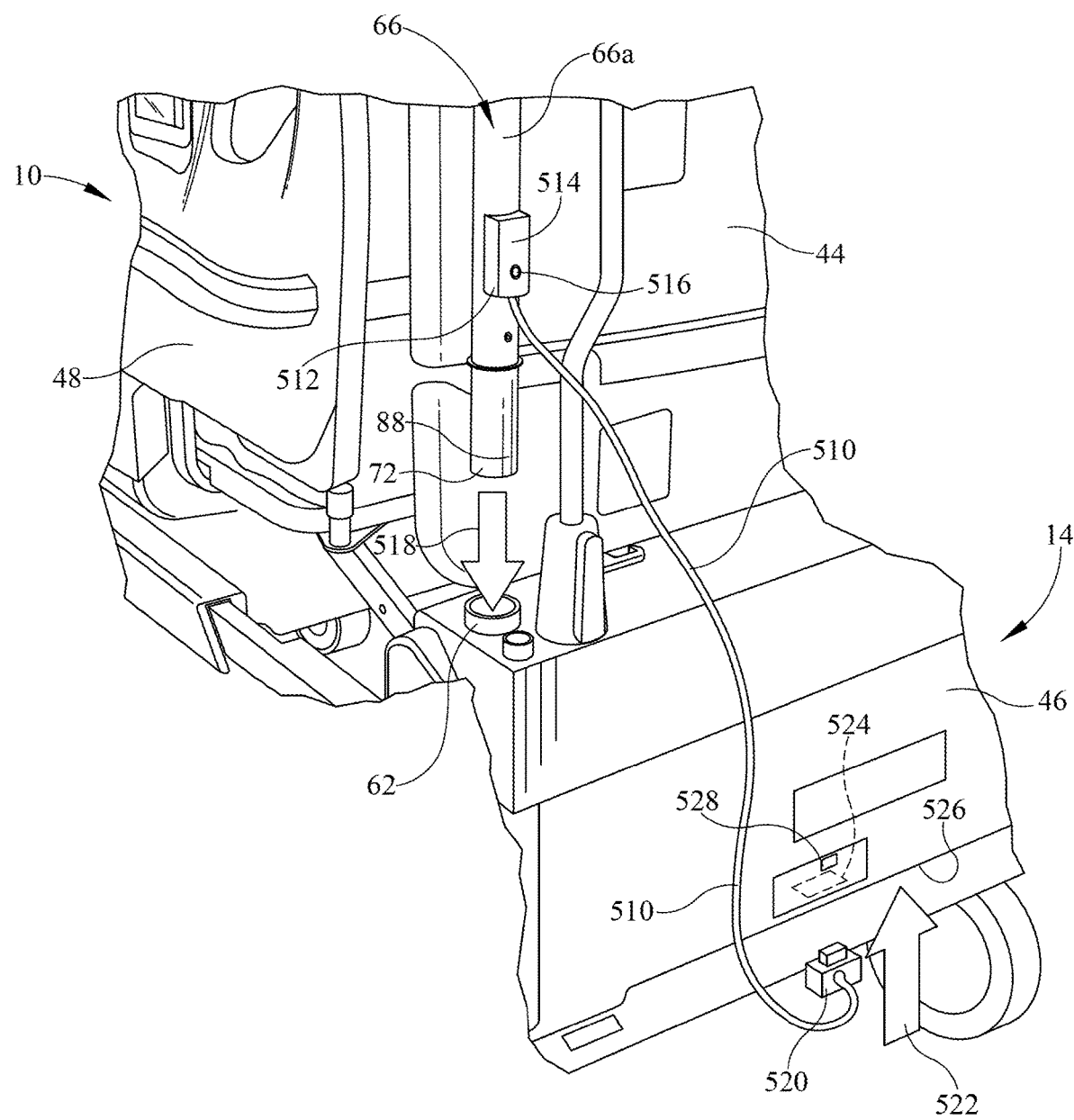
FIG. 14 is a perspective view of a portion of the hospital bed and a portion of the overhead arm assembly showing an electrical cable exiting from a bottom of a strain relief attached to a lower region of one of the arms of the overhead arm assembly and terminating at a male electrical connector which is arranged for upward movement to couple with a female connector (shown in phantom) located on a downwardly facing surface of an upright structure at a head end of the hospital bed.

Referring now to FIG. 14, an electrical cable 510 exits from a bottom end 512 of a strain relief 514. Strain relief 514 is made of a resilient material such as rubber or plastic and protects cable 510 from wearing against the exit hole (not shown) in portion 66a which is made from a metal material in some embodiments. Cable 510 includes electrical conductors (not shown) that are routed through overhead arm assembly 100 and that couple to electrical components included in patient interface support unit 160. Strain relief 514 is attached to a lower region of portion 66a of arm 66 by a suitable fastener such as illustrative screw 516 (see FIGS. 2 and 14). In FIG. 14, base 72 of overhead arm assembly 100 is arranged above socket 62 such that movement of base 72 in the direction indicated by arrow 518 results in insertion of base 72 into socket 62.

Cable 510 terminates at a male electrical connector 520 which, in the illustrative example, is a 9-pin, 90 degree D-subminiature (aka D-sub) connector 520. In FIG. 14, connector 520 is arranged for upward movement in the direction of arrow 522 to couple with a female connector 524 (shown in phantom) which is located on a downwardly facing surface 526 of the upright structure 46 at the head end 14 of the hospital bed 10. Mating of connector 520 with connector 524 results in the electrical components in unit 160 of overhead arm assembly 100 being communicatively coupled via a wired connection with the controller and accompanying circuitry of bed 10. A label having suitable indicia is attached to upright structure 46 to indicate the general location on downwardly facing surface 526 where female connector 524 is positioned. Thus, a caregiver or technician can reach under surface 526 with connector 520 in hand and feel around for connector 524 with a sufficient degree of accuracy to ultimately mate connectors 520, 524 together.

Figure 15:
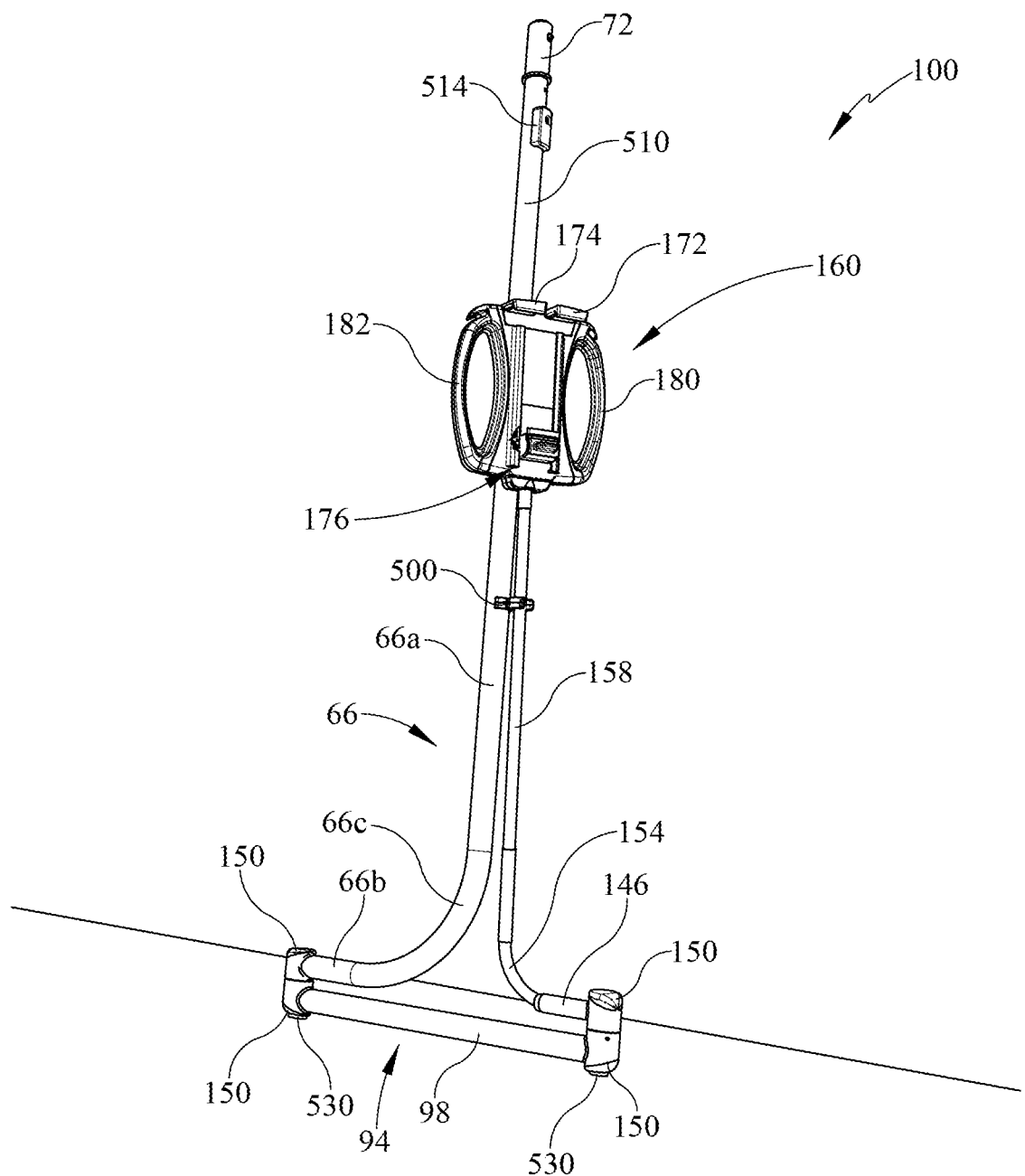
FIG. 15 is a perspective view of the overhead arm assembly in its T-shaped configuration and flipped upside down for storage when detached from the hospital bed.

Referring now to FIG. 15, the overhead arm assembly 100 is shown removed from bed 10 and flipped upside down for storage when in its T-shaped configuration having portion 158 of arm 144 received in clip 500. The caps 150 that are attached to pivot respective bases 96, 140 each have resilient pads 530 as shown in FIGS. 13 and 15. When overhead arm assembly 100 is flipped upside down for storage, the resilient pads 530 rest upon the underlying floor and serve as anti-skid feet 530. In some embodiments, pads 530 are made from rubber or a rubber-like material.

Overhead arm assembly 100 is shown leaning up against a wall in FIG. 15, but may just as well be leaning up against any other suitable structure such as a shelving unit in a storage closet, for example. In the illustrative example, resilient pads 530 are cylindrically shaped disks but other shapes such as oval, square, rectangular, etc. may be used if desired. In some embodiments, the caps 150 to which pads 530 couple include pockets or holes that receive portions of the pads 530 therein. Pads 530 are secured to caps 150 with suitable fasteners such as adhesive, snap fingers, screws, or a press fit into respective holes or pockets.

Figure 17:
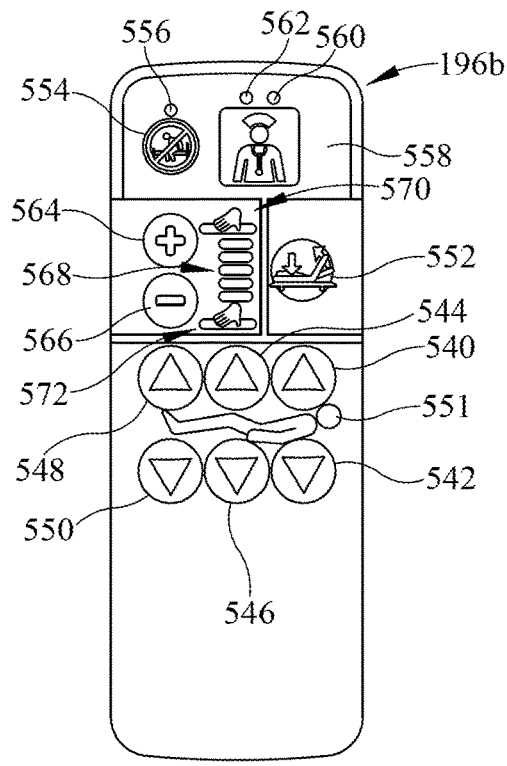
FIG. 17 is a front elevation view of a second flex circuit overlay that is included in the patient interface support unit suspended at the bottom of one of the arms of the overhead arm assembly, the second flex circuit having user inputs to control a second set of features of one style of the hospital bed.
Figure 18:
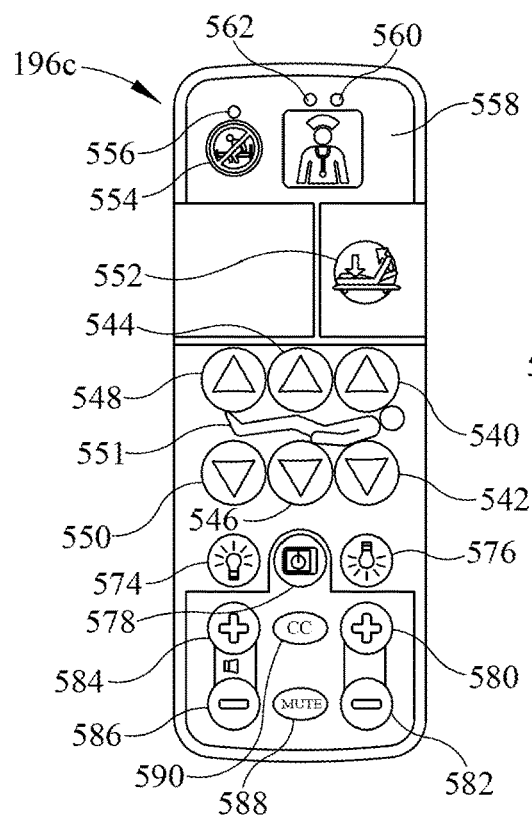
FIG. 18 is a front elevation view of a third flex circuit overlay that is included in the patient interface support unit suspended at a bottom of one of the arms of the overhead arm assembly, the third flex circuit having user inputs to control a third set of features of one style of the hospital bed.
Figure 19:
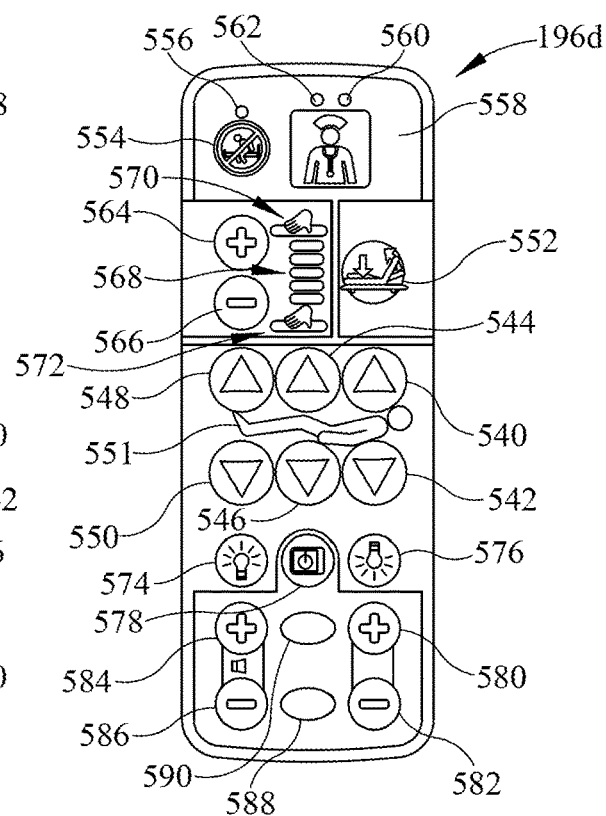
FIG. 19 is a front elevation view of a fourth flex circuit overlay that is included in the patient interface support unit suspended at a bottom of one of the arms of the overhead arm assembly, the fourth flex circuit having user inputs to control a fourth set of features of one style of the hospital bed.

Referring now to FIGS. 16-19, four different styles of flex circuit overlay 196 are shown and are indicated by reference numbers 196a (FIG. 16), 196b (FIG. 17), 196c (FIG. 18), 196d (FIG. 19). Each of flex circuit overlays 196a-d are coupleable to frame 175 of user interface unit 160. Flex circuit overlay 196a has user inputs to control a first set of features of one style of the hospital bed 10. In particular, flex circuit overlay 196a has a head up button 540 that is pressed to raise head section 28, a head down button 542 that is pressed to lower head section 28, a knee up button 544 that is pressed to raise thigh section 30, a knee down button 546 that is pressed to lower thigh section 30, a foot up button 548 that is pressed to raise foot section 34, and a foot down button 550 that is pressed to lower foot section 34. A patient indicia 551 is situated between buttons 540, 544, 548 and buttons 542, 546, 550.

Figure 16:
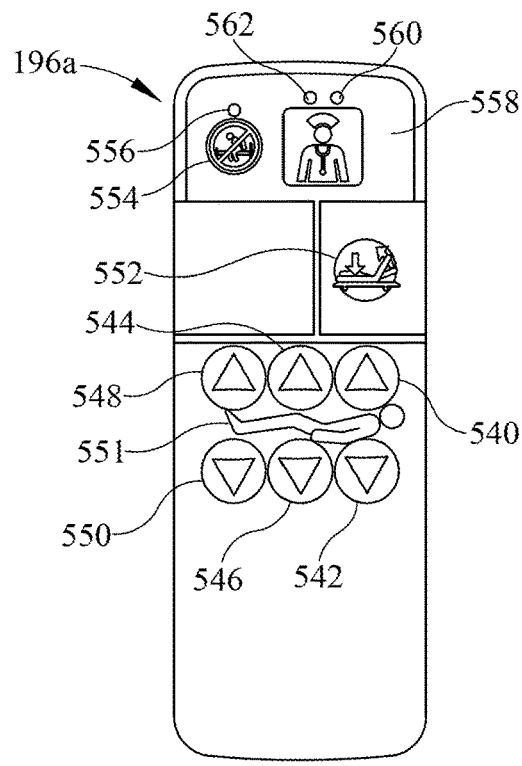
FIG. 16 is a front elevation view of a first flex circuit overlay that is included in a patient interface support unit suspended at a bottom of one of the arms of the overhead arm assembly, the first flex circuit having user inputs to control a first set of features of one style of the hospital bed.

Still referring to FIG. 16, flex circuit overlay 196a includes a side egress button 552 (aka a stand assist button 552) that is pressed when the patient wishes to exit the bed 10. Button 552 is positioned on overlay above head up button 540 in the illustrative example but may be positioned elsewhere in other embodiments. In response to button 552 being pressed, head section 28 is raised and both thigh section 30 and foot section 34 are lowered to a substantially flat or substantially horizontal position. This position of deck sections 38, 30, 34 facilitates patient egress from bed 10 in that the patient can use siderail 48, 50 attached to head section 28, depending upon the side of bed 10 from which the patient is egressing, as a stand assist grip. Overlay 196a also includes a stay-in-bed indicator 554 and an associated light emitting diode (LED) 556. Indicator 554 is illuminated in response to a bed exit or patient position monitoring (PPM) system of bed 10 being enabled. Details of a suitable bed exit/PPM system are shown and described in U.S. Pat. No. 7,253,366 which is hereby incorporated by reference herein in its entirety to the extent not inconsistent with the present disclosure which shall control as to any inconsistencies.

In some embodiments, LED 556 is illuminated to indicate the status of the bed exit/PPM system when enabled. For example, if the patient is properly positioned in bed 10, LED 556 is illuminated green. If the patient exits the bed or is out of position on the bed, LED 556 is illuminated amber or red and, in some embodiments, flashes. If a caregiver suspends the bed exit/PPM system from alarming while the patient is out of bed 10, LED 556 may be illuminated amber or red without flashing in some embodiments. For details regarding suspension of a bed exit/PPM system with an automatic re-enable feature, see U.S. Pat. No. 8,717,181 which is hereby incorporated by reference herein in its entirety to the extent not inconsistent with the present disclosure which shall control as to any inconsistencies.

Flex circuit overlay 196a of FIG. 16 also has a nurse call button 558 and associated LED's 560, 562. Nurse call button 558 is illuminated in response to bed 10 successfully communicating with a nurse call system of a healthcare facility. Bed 10 couples to hardware of the nurse call system via a 37-pin cable in some embodiments, as is known in the art. In other embodiments, bed 10 communicates wirelessly with the nurse call system. Examples of various embodiments of a nurse call system (as well as other components of a network in a healthcare facility) can be found in U.S. Pat. Nos. 8,598,995; 8,384,526; 8,169,304; 8,046,625; 7,746,218; 7,538,659; 7,319,386; 7,242,308; 6,897,780; 6,362,725; 6,147,592; 5,838,223; 5,699,038 and 5,561,412, all of which are hereby incorporated by reference herein in their entirety to the extent that they are not inconsistent with the present disclosure which shall control as to any inconsistencies.

In the illustrative embodiment, nurse call button 558 is configured as a "dead front" indicator which means that when backlighting behind button 558 is turned off, the nurse call button 558 cannot be seen on the overlay 196a. The backlighting is turned off when bed 10 is not successfully communicating with a nurse call system, for example, such as in those healthcare facilities that don't link bed 10 with a nurse call system. By hiding or rendering button 558 invisible (or at least substantially invisible), a patient will not press button 558 thinking a nurse call signal has been placed when bed 10 is not linked with a nurse call system. In some embodiments, stay in bed indicator 554 is also a dead front indicator that is not visible if the bed exit/PPM system of bed 10 is not enabled.

In response to the patient pressing nurse call button 558, LED 562 is illuminated yellow to indicate that a nurse call has been successfully placed to the nurse call system. In some embodiments, a single beep will also sound to indicate that a successful nurse call has been placed. Alternatively or additionally, a verbal message stating, "the care team has been called" will sound in those embodiments of bed 10 having voice alert capabilities. In response to a communication line from the nurse's station of the nurse call system being opened to the bed 10, LED 560 is illuminated green to indicate that the patient is able to talk with a caregiver at the nurse's station.

Referring now to FIG. 17, the second flex circuit overlay 196b has many of the same buttons and indicators as overlay 196a and so the same reference numbers are used for similar buttons and indicators. The description above of overlay 196a is equally applicable to overlay 196b with regard to the common elements and features except as noted below. However, overlay 196 is intended for use with beds 10 that have an integrated air mattress system. That is, in some embodiments, bed 10 has a pneumatic system for controlling inflation of one or more bladders of an air mattress supported on deck section 28, 30, 32, 34 of bed 10. With regard to side egress button 552 of overlay 196b, in some embodiments, one or bladders of the air mattress such as one or more air bladders in a seat region of the mattress, are inflated in response to button 552 being increased to increase the firmness in the seat region. A firmer seat region of the mattress makes it easier for the patient to egress from bed 10 at its side.

Overlay 196b has a mattress firm button 564 that is pressed to command the pneumatic system of bed 10 to further inflate the patient support bladder(s) of the mattress and a mattress soft button 566 that is pressed to command the pneumatic system of bed 10 to deflate the patient support bladder(s) of the mattress. The mattress includes multiple zones, in some embodiments, with each zone having its own bladder(s). Pressing button 564 results in additional inflation of the bladder(s) of each zone and pressing button 566 results in deflation of the bladder(s) of each zone.

Overlay 196b includes a bar graph 568 to indicate the firmness level of the mattress. In the illustrative example, five bars are provided in bar graph 568 but other embodiments may have a different number of bars. The bar on graph 568 that generally corresponds to the firmness level of the mattress is illuminated and the others are not. Alternatively, the bar on graph 568 that generally corresponds to the firmness level of the mattress is illuminated a first color (e.g., amber or red) and the others are illuminated a second color (e.g., green). A firm indicia 570 is situated above graph 568 and a soft indicia 572 is situated beneath graph 568. Indicia 570, 572 convey to the patient that pressing button 564 makes the mattress firmer and pressing button 566 makes the mattress softer.

Referring now to FIG. 18, the third flex circuit overlay 196c has many of the same buttons and indicators as overlay 196a and so the same reference numbers are used for similar buttons and indicators. The description above of overlay 196a is equally applicable to overlay 196c with regard to the common elements and features. However, overlay 196c includes a room light button 574 which is used via successive presses to turn on and off the main room lighting of the patient room in which bed 10 is situated. Overlay 196c also includes a reading light button 576 which is used via successive presses to turn on and off a reading light, typically located on a head wall unit or a room wall adjacent the head end 14 of bed 10.

Overlay 196c of FIG. 18 includes a TV button 578 which is used via successive presses to turn on and off a television (TV) located in the patient room. Other TV controls on overlay 196c include a channel up button 580 and a channel down button 582 for changing the channel of the TV either up or down, respectively; a volume up button 584 and a volume down button 586 for increasing or decreasing the TV volume, respectively; a mute button 588 which is used via successive presses to mute and unmute the TV; and a closed caption button 590 which is used via successive presses to turn closed captioning of the TV on and off.

Referring now to FIG. 19, the fourth flex circuit overlay 196d has all of the buttons and indicators described above in connection with overlays 196a, 196b, 196c and so the same reference numbers are used for similar buttons and indicators. The description above of overlays 196a, 196b, 196c is equally applicable to overlay 196d with regard to the common elements and features. It should be appreciated that each of overlays 196a-d can be attached to frame 175 of unit 160 during manufacture of the overhead arm assembly 100. Each overlay 196a-d has a circuit board that couples to the remaining circuitry, described below in connection with FIG. 20, of unit 160. The style of overlay 196a-d chosen for inclusion in unit 160 is based on the type of features and functions of the associated bed 10, whether the bed 10 will connect to a nurse call system, and whether the unit 160 is intended to permit control of lights and TV's that are not part of bed 10.

Figure 20:
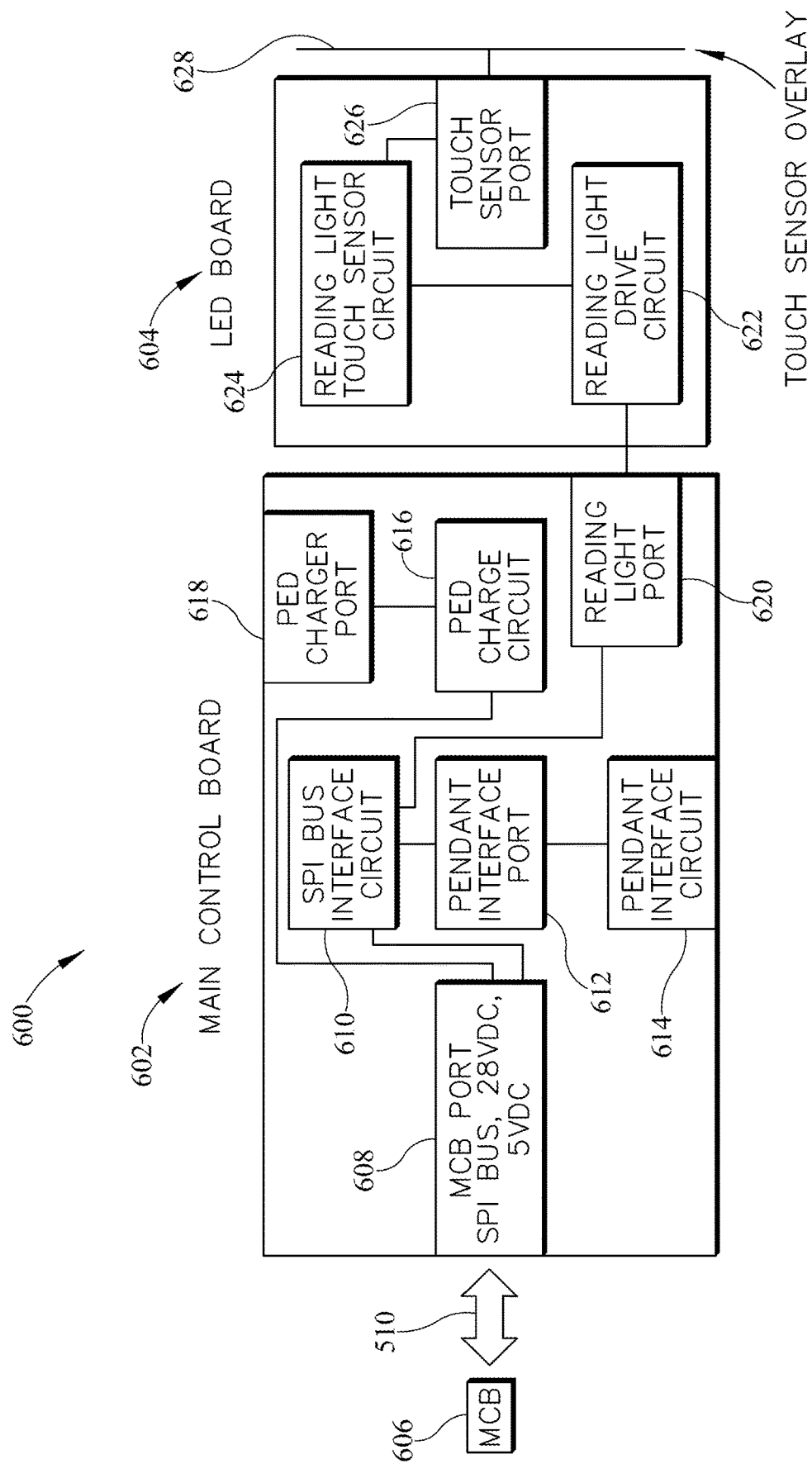
FIG. 20 is a block diagram showing an alternative electrical system of the patient interface portion of the patient interface support unit of the overhead arm assembly.

Referring now to FIG. 20, a block diagram of an alternative electrical system 600 of patient interface support unit 160 of overhead arm assembly 100 includes a main control board 602 and an LED board 604. Main control board 602 of unit 160 is electrically coupled to the main control board (MCB) 606 of bed 10 via cable 510 as indicated by the double headed arrow in FIG. 20. Thus, system 602 is configured for bidirectional communication with MCB 606 of bed 10. As such, commands entered using the buttons of overlays 196a-d are communicated to MCB of bed 606 which, in turn, commands the appropriate operation of the associated bed features and functions.

Main control board 602 includes an MCB Port 608 to which cable 510 is attached. Port 608 provides connectivity using a serial peripheral interface (SPI) bus and also provides 28 Volt Direct Current (VDC) and 5 VDC power from bed 10 to electrical system 600. Port 608 is electrically coupled to a SPI bus interface circuit 610 which is, in turn, electrically coupled to a pendant interface circuit 612. A pendant interface port 614 is also coupled to the pendant interface circuit 612. Overlays 196a-d each have a connector that mates with port 614. Overlays 196a-d of unit 160 are the same overlays 196a-d which are used with a hand held controller pendant of bed 10. In some embodiments, bed 10 may include overhead arm assembly 100 and the hand held controller pendant for control of the features and functions of bed 10.

It is possible that overhead arm assemblies 100 having overlays 196b-d may be attached to a bed 10 that does not have all of the features and functions that correspond to the buttons and indicators of the respective overlay 196b-d. Under such circumstances, MCB 606 communicates the available features and functions of bed 10 (e.g., whether the bed 10 has an air mattress with one or more bladders, whether bed 10 is coupled to a nurse call system, or whether bed 10 is permitted to control lighting or a TV) to circuit 612. Circuit 612 then determines which of the buttons of overlays 196b-d are to be backlit. Thus, each button of overlays 196a-d is individually back lit with a corresponding LED, for example. The backlighting is turned off for any features of overlays 196a-d that are not available for control.

MCB port 608 is also electrically coupled to a PED charge circuit 616 which, in turn, is coupled to a PED charger port 618. Charger port 618 is the electrical connector portion of structure 164 which is referred to as USB charging port 164 elsewhere in the present application. Thus, personal electrical devices (PED's) such as tablet computers, smart phones, music players, and the like can be recharged by plugging them into PED charger port 618. PED charge circuit 616 controls the voltage and/or current through port 618 to charge the associated PED coupled to port 618.

As also shown in FIG. 20, SPI bus interface circuit 610 is coupled to a reading light port 620. Port 620 is electrically coupled to reading light drive circuit 622 that is included on LED board 604. Reading light drive circuit 622 is electrically coupled to a reading light touch sensor circuit 624 which is, in turn, electrically coupled to a touch sensor port 626. Touch sensor port 626 is electrically coupled to a touch sensor overlay 628. Touch sensor overlay 628 senses when a user touches LED light assembly 190 positioned in the bottom of the user interface unit 160. Successive touches of LED light assembly 190 is sensed by sensor overlay 628 and circuit 624 commands LED light assembly 190 to adjust the intensity or brightness of the light being emitted therefrom or to turn off the light. For example, LED light assembly 190 may have three levels of brightness (e.g., low, medium, and high) in some embodiments. A fourth touch of LED light assembly 190 turns the light off in such embodiments, for example. LED light assemblies 190 having a different number of levels of brightness (e.g., 2 levels or more than 3 levels) are also contemplated by this disclosure.

Although this disclosure refers to specific embodiments, it will be understood by those skilled in the art that various changes in form and detail may be made without departing from the subject matter set forth in the accompanying claims.

The invention claimed is:

1. A user interface for a patient support apparatus, the user interface comprising
    a frame including a first side and a second side, and
    a support structure positioned on the second side, the support structure being configured to support personal digital assistants of varying sizes, wherein the support structure includes a fixed base and a movable clamp with a locking mechanism,
    wherein the movable clamp is movable relative to the fixed base, and
    wherein the locking mechanism includes a lock operable to secure the movable clamp at a plurality of positions relative to the fixed base, wherein the lock comprises a pair of arms with each arm pivotable about a respective pivot point, the arms formed to include catches, and the locking mechanism further includes a pair of guides that are each engaged by the respective catches of the arms to lock the movable clamp in a particular position.

2. The user interface of claim 1, wherein the movable clamp includes an actuator that releases the movable clamp for movement away from the base.

3. The user interface of claim 2, wherein the movable clamp comprises a first bias member that biases the locking mechanism to a locked position and a second bias member that biases the locking mechanism to a released position.

4. The user interface of claim 3, wherein the first bias member has a bias that is greater than the second bias member.

5. The user interface of claim 1, wherein the user interface comprises a dedicated charging port positioned on the first side.

6. The user interface of claim 5, wherein the dedicated charging port is provided with two modes of patient protection from electrical faults.

7. The user interface of claim 6, wherein the dedicated charging port is monitored for faults.

8. The user interface of claim 7, wherein the fault monitor includes two modes of patient protection from electrical faults.

9. The user interface of claim 8, wherein the user interface device further comprises at least one user input device positioned on the first side.

10. The user interface of claim 9, wherein the at least one user input device is a nurse call activation switch.

11. The user interface of claim 1, wherein a release mechanism comprises a ratcheting structure that allows the movable clamp to be moved in a first direction toward the fixed base to a plurality of positions without releasing the locking mechanism, the ratcheting structure preventing movement of the movable clamp in a second direction, opposite the first direction, without releasing the locking mechanism.

12. The user interface of claim 11, wherein the locking mechanism is released by moving a handle in the second direction, the handle acting on an actuator to cause the release mechanism to disengage a first portion of the ratcheting structure with a second portion of the ratcheting structure to allow free movement of the movable clamp relative to the fixed base.

13. A user interface for a patient support apparatus, the user interface comprising
    a frame including a first side and a second side, a support structure positioned on the second side, the support structure being configured to support personal digital assistants of varying sizes, wherein the support structure includes a fixed base and a movable clamp, the movable clamp movable relative to the fixed base with a locking mechanism resisting movement of the movable clamp away from the base, wherein the locking mechanism includes a lock that has a pair of arms, the arms formed to include catches, and the locking mechanism further includes guides that are each engaged by the respective arms, wherein the guides include serrations engaged by the catches on the arms.

14. The user interface of claim 13, wherein the movable clamp comprises a first bias member that biases the arms to a locked position and a second bias member that biases the arms to a released position.

15. The user interface of claim 14, wherein the first bias member has a bias that is greater than the second bias member.

16. The user interface of claim 15, wherein the first bias member comprises a torsional spring.

17. The user interface of claim 15, wherein the second bias member simultaneously acts on both arms to urge the arms together and out of engagement with the guides.

18. A user interface for a patient support apparatus, the user interface comprising a frame including a first side and a second side, and
a support structure positioned on the second side, the support structure being configured to support personal digital assistants of varying sizes, wherein the support structure includes a fixed base and a movable clamp, the movable clamp movable relative to the fixed base with a locking mechanism resisting movement of the movable clamp away from the base, wherein a release mechanism comprises a ratcheting structure that allows the movable clamp to be moved in a first direction toward the fixed base to a plurality of positions without releasing the locking mechanism, the ratcheting structure preventing movement of the movable clamp in a second direction, opposite the first direction, without releasing the locking mechanism, wherein the locking mechanism is released by moving a handle in the second direction, the handle acting on an actuator to cause the release mechanism to disengage a first portion of the ratcheting structure with a second portion of the ratcheting structure to allow free movement of the movable clamp relative to the fixed base, and wherein the ratcheting structure comprises at least one arm that includes a catch and at least one guide that includes a plurality of serrations, the catch and the serrations cooperating to resist movement in the second direction when the catch is engaged with the serrations.

19. The user interface of claim 18, wherein the actuator, when the handle is moved in the second direction, acts on the arm to disengage the catch from the serrations to permit movement of the movable clamp relative to the fixed base in the second direction.

20. A user interface for a patient support apparatus, the user interface comprising a frame including a first side and a second side, and
a support structure positioned on the second side, the support structure being configured to support personal digital assistants of varying sizes, wherein the support structure includes a fixed base and a movable clamp, the movable clamp movable relative to the fixed base with a locking mechanism resisting movement of the movable clamp away from the base, wherein a release mechanism comprises a ratcheting structure that allows the movable clamp to be moved in a first direction toward the fixed base to a plurality of positions without releasing the locking mechanism, the ratcheting structure preventing movement of the movable clamp in a second direction, opposite the first direction, without releasing the locking mechanism, wherein the locking mechanism is released by moving a handle in the second direction, the handle acting on an actuator to cause the release mechanism to disengage a first portion of the ratcheting structure with a second portion of the ratcheting structure to allow free movement of the movable clamp relative to the fixed base, and wherein the ratcheting structure comprises two arms, each arm including a catch, and two guides, the guides each including a plurality of serrations, the catches and the serrations cooperating to resist movement in the second direction when the catches are engaged with the serrations, and where the actuator, when the handle is moved in the second direction, acts on the arms to disengage the catches from the serrations to permit movement of the movable clamp relative to the fixed base in the second direction.

* * * * *